US010589813B2

(12) United States Patent
Dubb

(10) Patent No.: US 10,589,813 B2
(45) Date of Patent: Mar. 17, 2020

(54) PANNIER SYSTEM

(71) Applicant: Abraham Samuel Dubb, Philadelphia, PA (US)

(72) Inventor: Abraham Samuel Dubb, Philadelphia, PA (US)

( * ) Notice: Subject to any disclaimer, the term of this patent is extended or adjusted under 35 U.S.C. 154(b) by 39 days.

(21) Appl. No.: 15/868,476

(22) Filed: Jan. 11, 2018

(65) Prior Publication Data
US 2019/0210680 A1  Jul. 11, 2019

(51) Int. Cl.
*B62J 9/00* (2020.01)
*B65D 5/32* (2006.01)
*B65D 5/46* (2006.01)
*B65D 5/66* (2006.01)
*B65D 5/42* (2006.01)

(52) U.S. Cl.
CPC .............. *B62J 9/001* (2013.01); *B65D 5/321* (2013.01); *B65D 5/4266* (2013.01); *B65D 5/46* (2013.01); *B65D 5/66* (2013.01)

(58) Field of Classification Search
CPC .......... B62J 9/001; B65D 5/4266; B65D 5/66; B65D 5/321; B65D 5/46
USPC ................................................. 224/430, 432
See application file for complete search history.

(56) References Cited

U.S. PATENT DOCUMENTS

| | | | |
|---|---|---|---|
| 567,159 A * | 9/1896 | Peirce ........................ | B62J 9/00 224/432 |
| 963,769 A * | 7/1910 | Johnson et al. ......... | B65D 7/26 220/6 |
| 1,963,333 A * | 6/1934 | Morales ..................... | B62J 9/00 224/422 |
| 3,874,574 A * | 4/1975 | Heise ......................... | B62J 9/00 224/417 |
| 3,934,770 A * | 1/1976 | Larsen ....................... | B62J 9/00 224/429 |
| 3,937,374 A * | 2/1976 | Hine, Jr. .................... | B62J 9/00 224/430 |
| 4,050,615 A * | 9/1977 | Kline ......................... | B62J 9/00 224/422 |
| 4,295,586 A * | 10/1981 | Shockley ................... | B62J 9/00 224/430 |

(Continued)

FOREIGN PATENT DOCUMENTS

| DE | 202017005234 U1 * | 10/2017 | ............. B62J 9/001 |
|---|---|---|---|
| DE | 202017005234 U1 | 10/2017 | |

OTHER PUBLICATIONS

International Search Report and Written Opinion for Application No. PCT/US2018/032302, dated Jul. 20, 2018. 9 pages.

(Continued)

*Primary Examiner* — Nathan J Newhouse
*Assistant Examiner* — Lester L Vanterpool
(74) *Attorney, Agent, or Firm* — McCarter & English, LLP; Vadim E. Cherkasov

(57) ABSTRACT

The disclosure relates to a blank for a collapsible, folded pannier configured to be mounted on a bicycle rack. The blank includes a bottom section that forms an item supporting surface when the blank is folded into the folded pannier configuration. The blank includes a lateral face section hingedly connected with the bottom section at a first fold line. The blank includes a medial face section hingedly connected with the bottom section at a second fold line. The blank is adapted to be folded from an unfolded blank configuration into a folded pannier configuration.

20 Claims, 19 Drawing Sheets

(56) References Cited

U.S. PATENT DOCUMENTS

| | | | |
|---|---|---|---|
| 4,307,834 A | 12/1981 | Roccaforte | |
| 4,345,703 A * | 8/1982 | Allen | B62J 9/00 224/417 |
| 4,450,988 A * | 5/1984 | Meisel | B62J 9/00 224/417 |
| 5,437,390 A * | 8/1995 | Romick | B65D 5/6611 206/538 |
| 6,213,387 B1 | 4/2001 | Zinke | |
| 6,843,396 B2 * | 1/2005 | Champagne | B62J 7/04 224/422 |
| 7,597,209 B2 * | 10/2009 | Rothschild | A45C 7/0036 220/23.87 |
| 8,074,852 B2 * | 12/2011 | Crum, Jr. | B62J 9/001 224/432 |
| 8,973,797 B2 * | 3/2015 | Langlois | B62J 9/00 224/432 |
| 2006/0243785 A1 | 11/2006 | Wang | |
| 2014/0138417 A1 | 5/2014 | Langlois | |
| 2016/0198673 A1 * | 7/2016 | Waid | A01K 1/0125 119/167 |
| 2016/0229474 A1 * | 8/2016 | Carlson | B62J 7/04 |

OTHER PUBLICATIONS

Noe, Rain, Making Sturdy Stuff Out of Plastic Sheets, Part 1: Mail Bins, Core77, available at http://www.core77.com/posts/19254/Making-Sturdy-Stuff-Out-of-Plastic-Sheets-Part-1-Mail-Bins (May 6, 2011).

Peterson, Kent, Toby's Coroplast Panniers & Fenders, Kent's Bike Blog, available at http://kentsbike.blogspot.com/2007/01/tobys-coroplast-panniers-fenders.html?m=1 (Jan. 22, 2007).

MTBR, Frame Bag made from Coroplast, available at http://forums.mtbr.com/bikepacking-bike-expedition/frame-bag-made-coroplast-781618.html (Apr. 13, 2012).

U.S. Appl. No. 15/977,459, filed May 11, 2018, Pending.

* cited by examiner

PANNIER SYSTEM

BACKGROUND

Bicycle panniers are generally mounted on a rack of a bicycle and used for storage of various items of the rider. Traditional panniers are generally made from a woven material that may be costly to fabricate or replace. Due to the woven construction of traditional panniers, the configuration of such panniers cannot be customized based on the size and/or shape of the rider's bicycle.

SUMMARY

The disclosure relates to a pannier system including two pannier blanks that can be folded and engaged with each other over a rack on a bicycle. Each pannier blank can be fabricated from a cost-effective material, such as corrugated plastic board, corrugated cardboard, or the like. Each pannier can therefore be easily collapsed for storage, and cheap to replace if damage to the pannier occurs. Although the general panels and fold lines are maintained for different configurations of the panniers, the shape and/or dimensions of the panels and fold lines can be adjusted to customize the pannier system for bicycles of different sizes. A convenient and easily replaceable pannier system is therefore provided.

In accordance with some embodiments of the present disclosure, an exemplary blank for a collapsible, folded pannier is provided. The blank includes a bottom section that forms an item supporting surface when the blank is folded into the folded pannier configuration. The blank includes a lateral face section hingedly connected with the bottom section at a first fold line. The blank includes a medial face section hingedly connected with the bottom section at a second fold line. The blank is adapted to be folded into a folded pannier configuration, and subsequently capable of being unfolded into an unfolded blank configuration.

In the unfolded blank configuration, the blank can define a substantially flat and planar structure having a uniform thickness. In the folded pannier configuration, the blank can be configured to be mounted on a rack of a bicycle. The blank includes a central, vertical axis extending between proximal and distal ends of the blank. The bottom section, lateral face section, and medial face sections can extend substantially in-line with the central, vertical axis. The first and second fold lines can extend substantially perpendicularly to the central, vertical axis.

In the folded pannier configuration, the bottom section, the lateral face section, and the medial face section can define an enclosure configured to receive therein one or more items. The blank includes a lid section hingedly connected with the lateral face section at a third fold line. In some embodiments, the blank can include a clearance section hingedly connecting the lid section with the lateral face section. The blank includes first and second overhang sections hingedly connected to lateral sides of the lid section at fourth and fifth fold lines. The fourth and fifth fold lines can extend substantially parallel to a central, vertical axis of the blank.

The blank includes first and second arm face sections hingedly connected to the lateral face section at sixth and seventh fold lines. In some embodiments, the first and second arm face sections can each define a substantially L-shaped configuration. The blank includes a rack face section hingedly connected to the medial face section at an eighth fold line. The eighth fold line can extend substantially perpendicularly to the central, vertical axis of the blank. The blank includes first and second rack tabs hingedly connected to lateral sides of the rack face section at ninth and tenth fold lines. The ninth and tenth fold lines can extend substantially parallel to the central, vertical axis of the blank.

In accordance with embodiments of the present disclosure, an exemplary collapsible, folded pannier system is provided. The pannier system includes a first pannier, and a second pannier engaged with the first pannier. Each of the first and second panniers includes a bottom section that forms an item supporting surface of the first and second panniers in a folded pannier configuration, a lateral face section hingedly connected with the bottom section at a first fold line, and a medial face section hingedly connected with the bottom section at a second fold line. Each of the first and second panniers can be adapted to be folded into a folded pannier configuration, and subsequently capable of being unfolded into an unfolded configuration.

In the unfolded configuration, each of the first and second panniers can define a substantially flat and planar structure having a uniform thickness. The lateral face sections of the first and second panniers can be spaced to form a passage configured to receive therein a bicycle rack. Each of the first and second panniers includes a lid section hingedly connected with the lateral face section at a third fold line.

In some embodiments, the pannier system includes complementary attachment mechanisms secured to the lid section of the first and second panniers. The attachment mechanisms can be configured to releasably engage the lid sections with each other. In some embodiments, the pannier system includes a handle mounted to the lid section of the first pannier and a complementary cutout formed in the lid section of the second pannier. The handle can be configured to engage with the cutout to releasably engage the lid sections with each other.

In accordance with embodiments of the present disclosure, an exemplary method of forming a blank for a collapsible, folded pannier is provided. The method includes providing a blank defining a substantially flat configuration. The method includes forming a bottom section in the blank. The bottom section forms an item supporting surface when the blank is folded into a folded pannier configuration. The method includes forming a lateral face section in the blank, and forming a first fold line in the blank between the bottom section and the lateral face section. The method includes forming a medial face section in the blank, and forming a second fold line in the blank between the bottom section and the medial face section. The blank can be adapted to be folded into the folded pannier configuration, and subsequently capable of being unfolded into an unfolded blank configuration.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed pannier system, reference is made to the accompanying figures, wherein.

DETAILED DESCRIPTION

Figure 1:
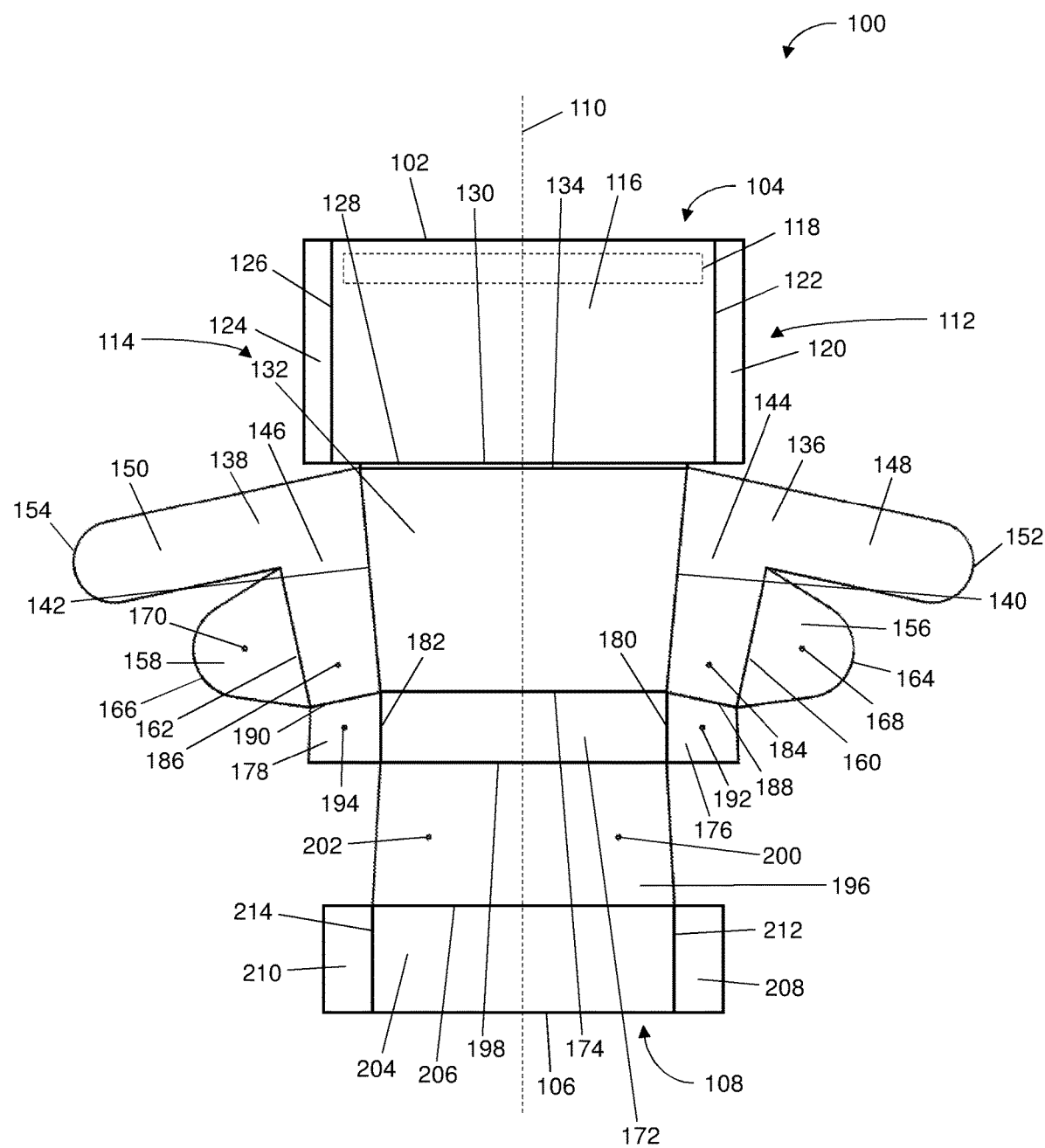
FIG. 1 is a top view of an exemplary pannier blank of the present disclosure in an unfolded configuration.
Figure 2:
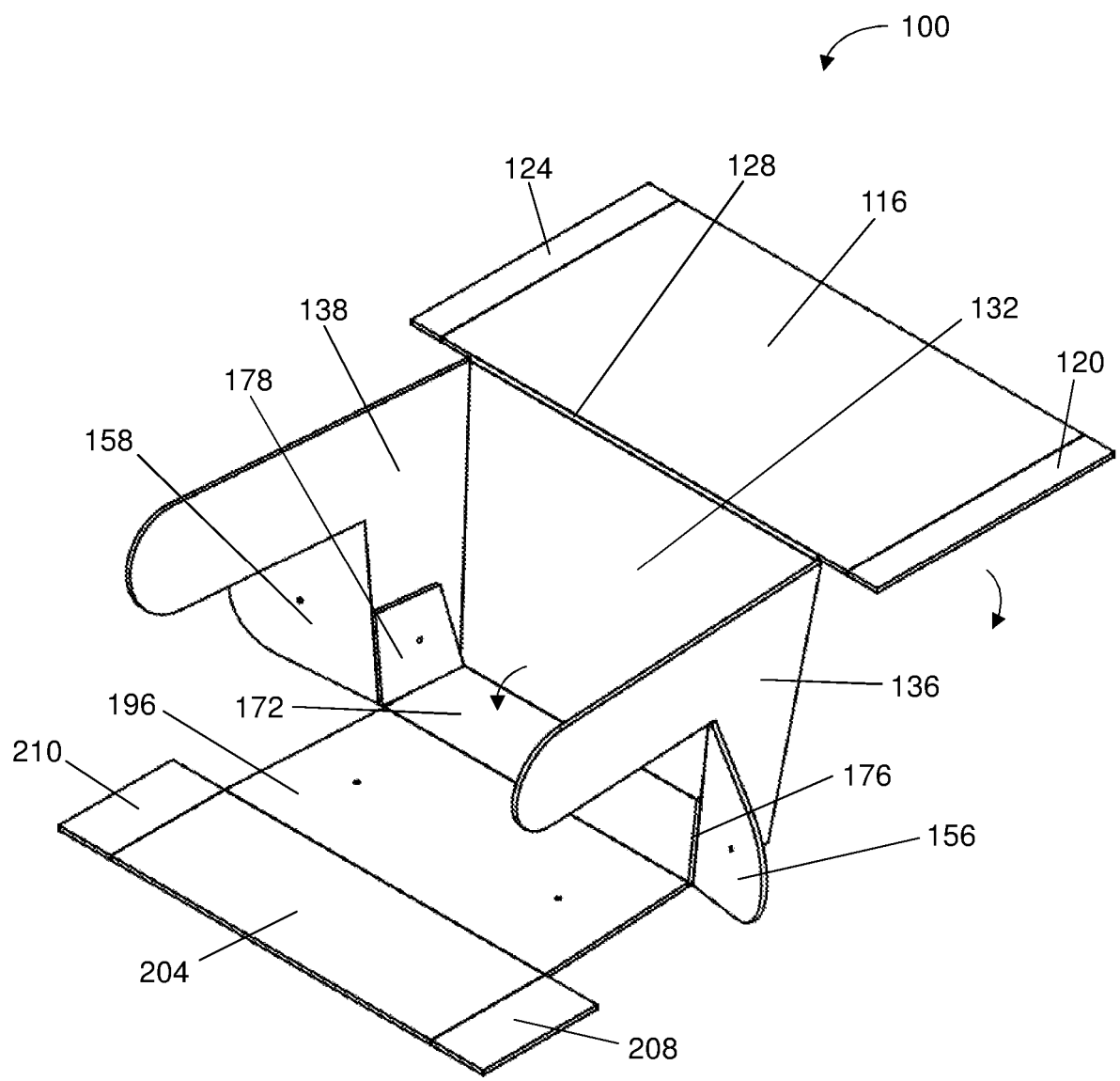
FIG. 2 is a perspective view of an exemplary pannier blank of the present disclosure in a partially folded configuration.
Figure 3:
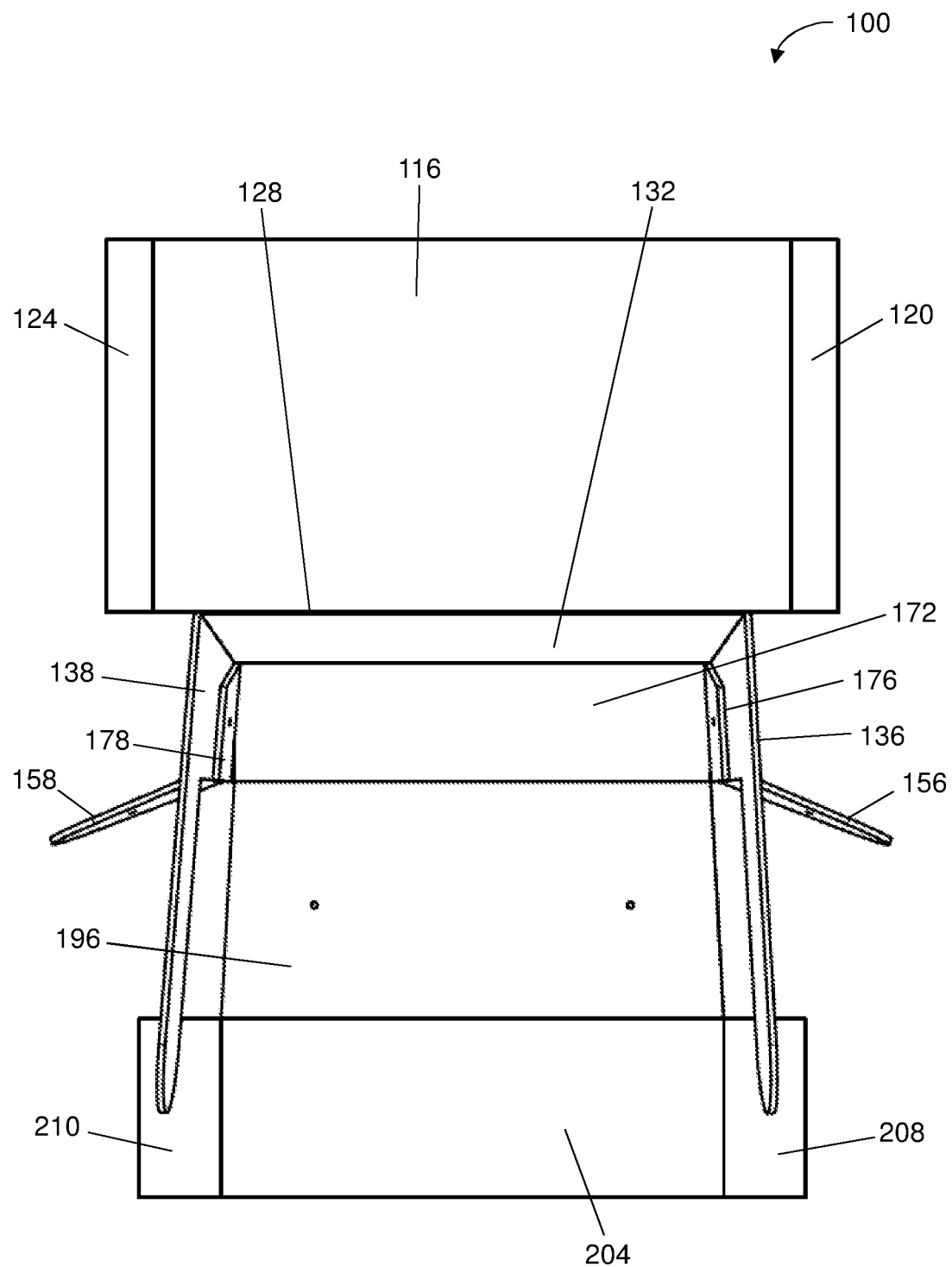
FIG. 3 is a top view of an exemplary pannier blank of FIG. 2.
Figure 4:
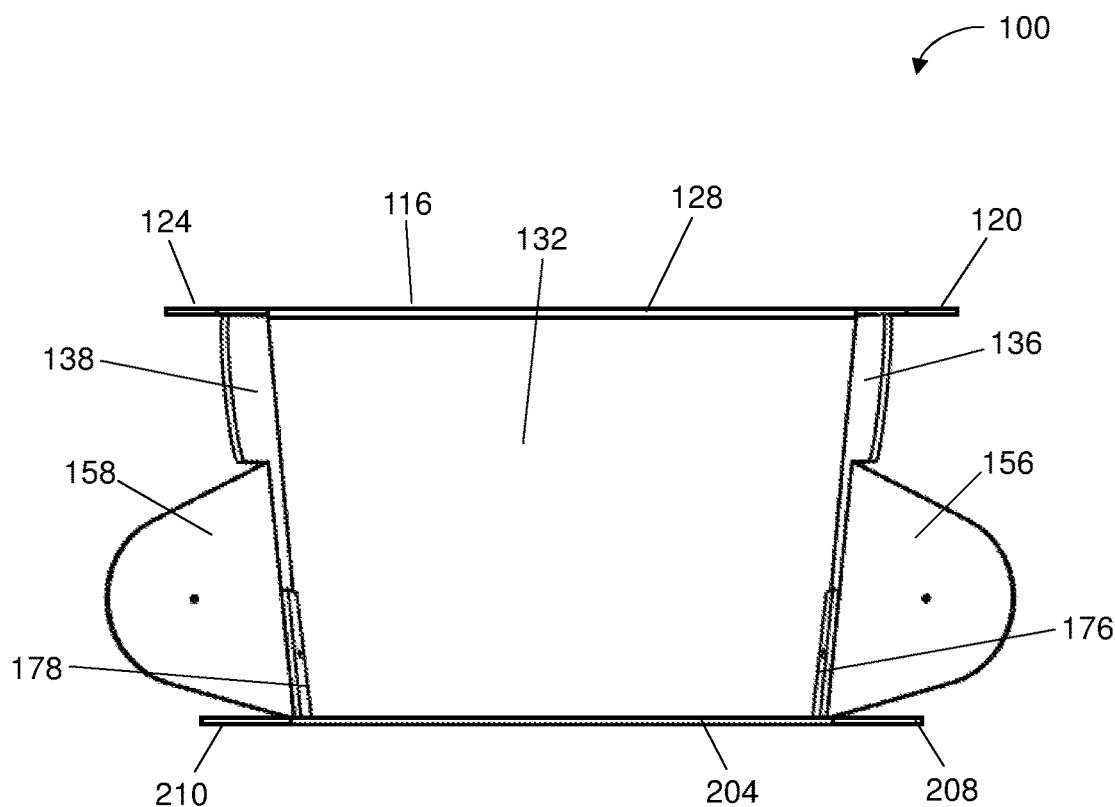
FIG. 4 side view of an exemplary pannier blank of FIG. 2.
Figure 5:
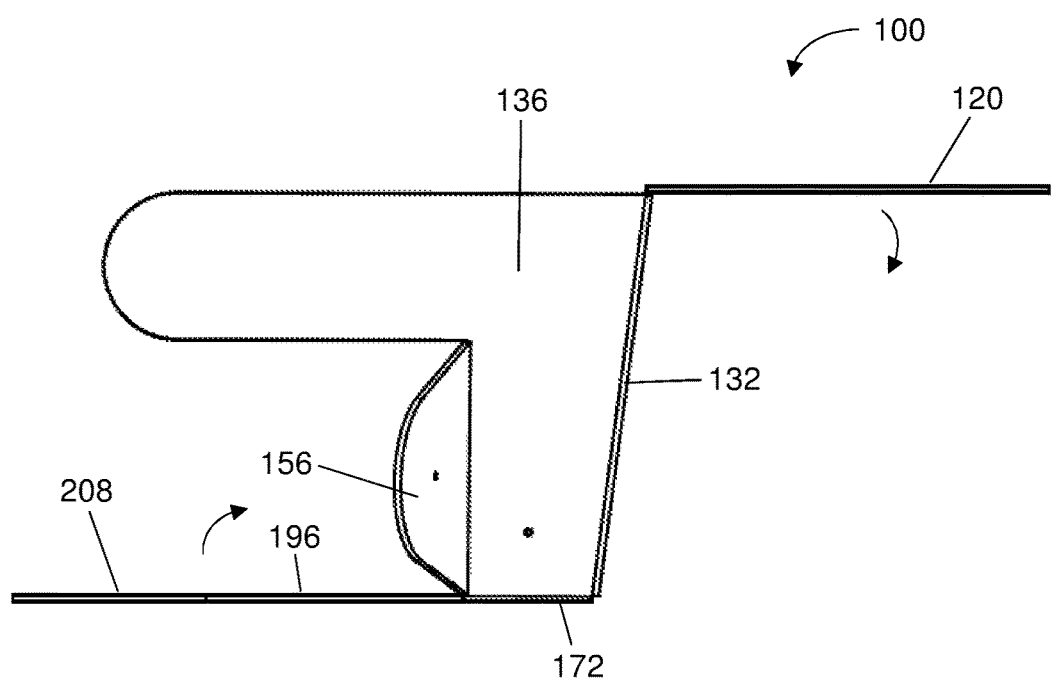
FIG. 5 is a front view of an exemplary pannier blank of FIG. 2.
Figure 6:
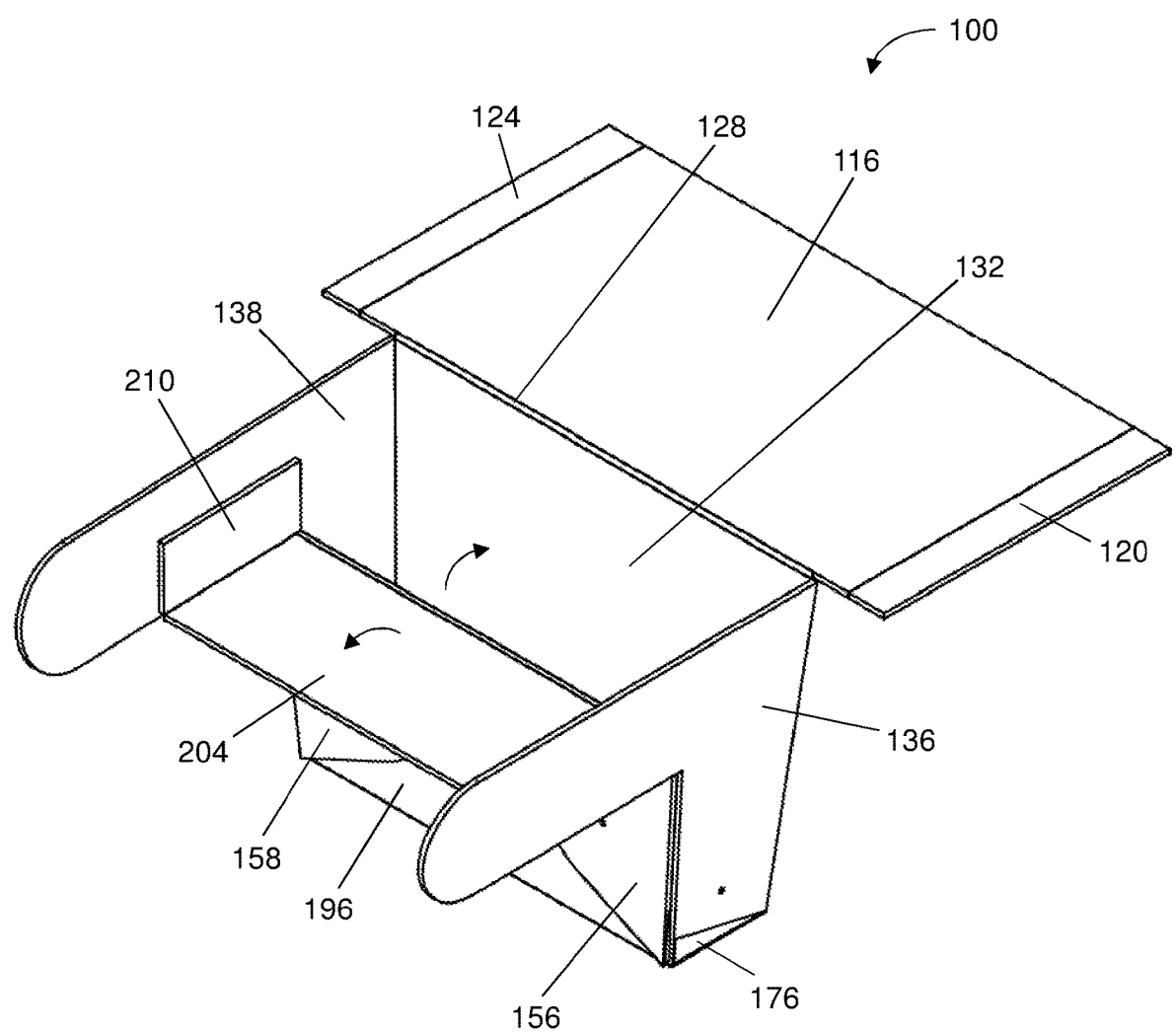
FIG. 6 is a perspective view of an exemplary pannier blank of the present disclosure in a partially folded configuration.
Figure 7:
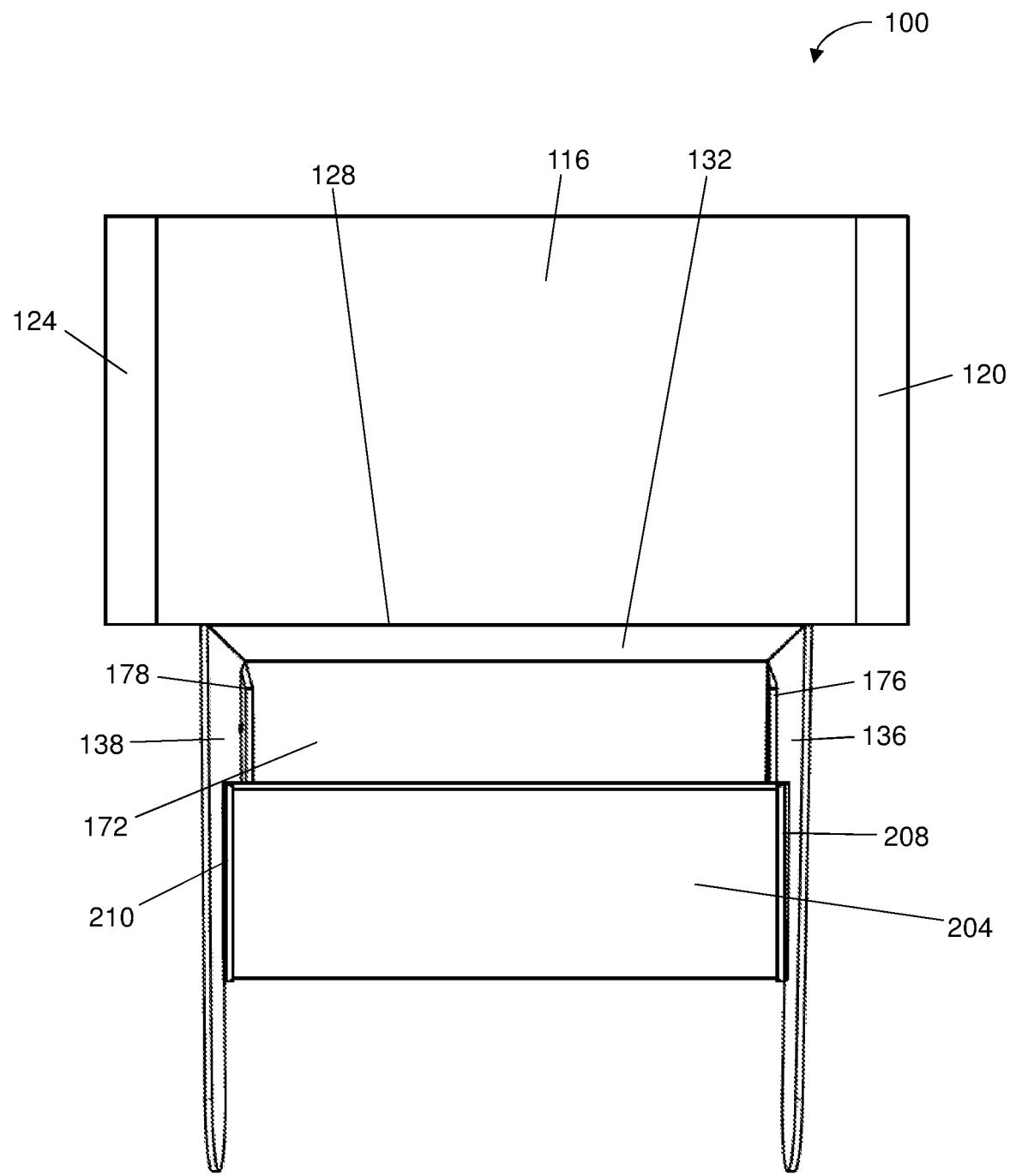
FIG. 7 is a top view of an exemplary pannier blank of FIG. 6.
Figure 8:
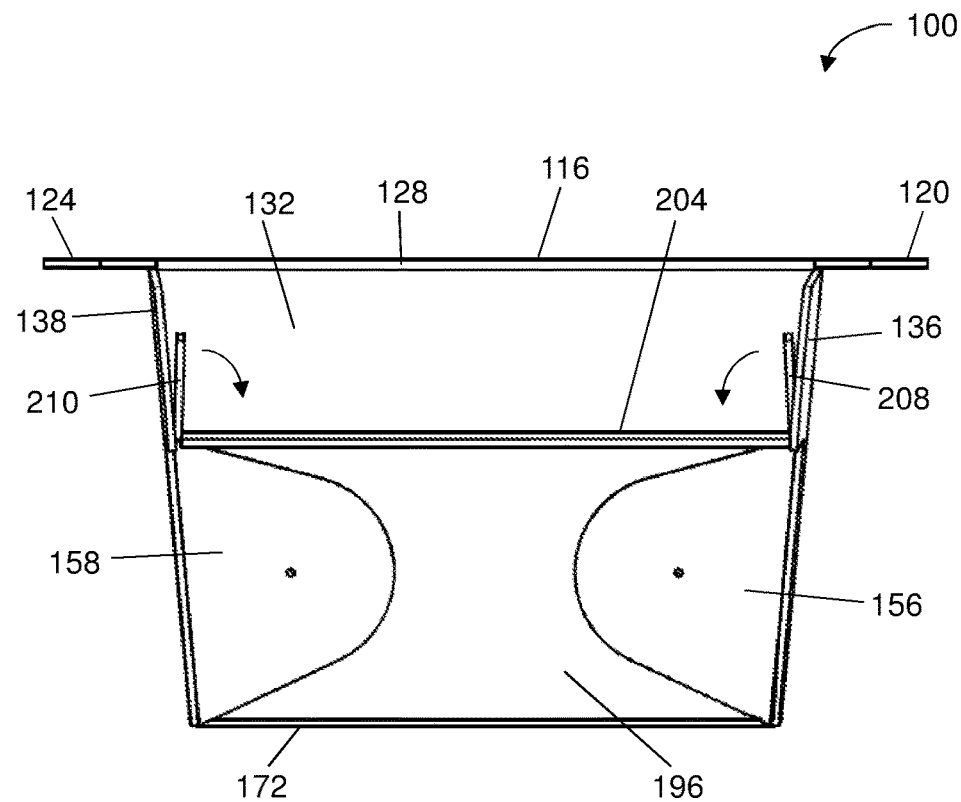
FIG. 8 is a side view of an exemplary pannier blank of FIG. 6.
Figure 9:
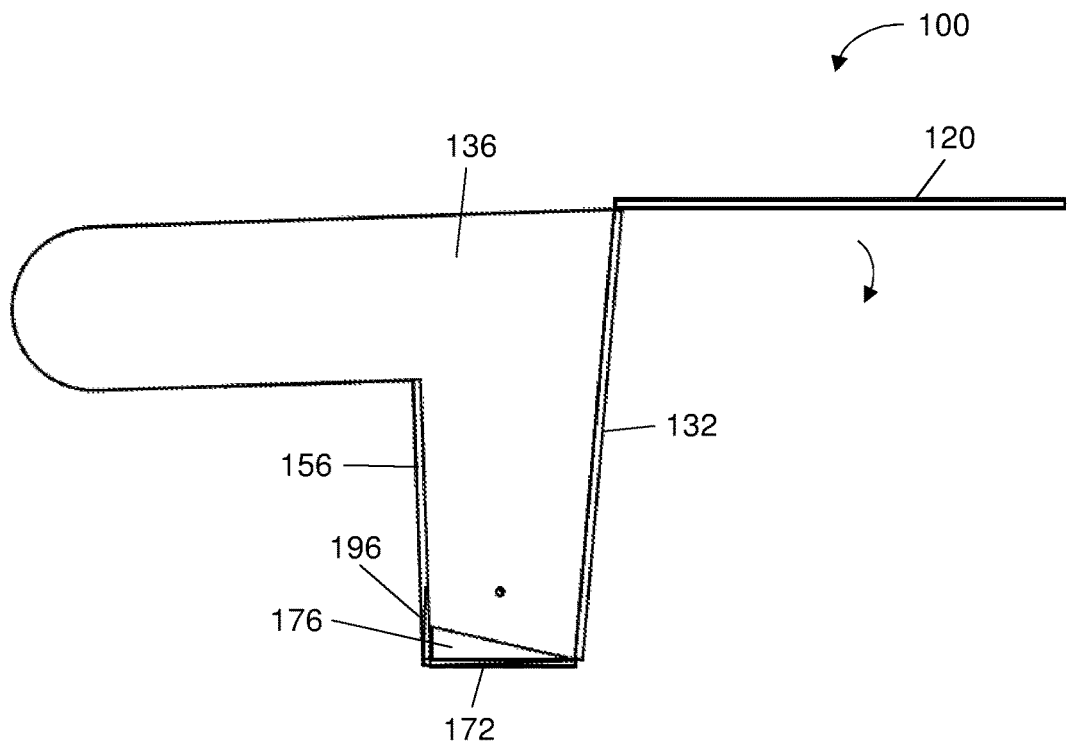
FIG. 9 is a front view of an exemplary pannier blank of FIG. 6.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "blank" as used herein is defined as any formed material that has been cut or punched out of a substantially flat piece of material, such as corrugated plastic board or corrugated cardboard. It should be understood that the material of the blank can be selected such that in the folded, pannier configuration, the material provides sufficient support for the items being stored in the pannier and prevents damage to such items during riding of the bicycle, while allowing the blank to be conveniently collapsed into the unfolded configuration. In some embodiments, the material of the blank can be selected to have a surface coating or layer that provides resistance to moisture (e.g., a waterproof or water resistant layer). In some embodiments, the material of the blank can be selected to have a metallic outer layer or coating to provide additional strength and security. The blank can be substantially flat in the unfolded configuration and can define a thickness suitable for providing the requisite support for the items when in the folded, pannier configuration.

The term "folded" or "substantially folded" as used herein is defined as one or more portions of the blank being moved to be placed adjacent to or closer to another portion of the blank, or rotated to a different angle relative to another portion of the blank.

The term "collapse" as used herein is defined as any amount of unfolding or separation of portions of the blank from the fully folded, pannier configuration. For example, collapsing the fully folded pannier can involve unfolding and/or or separating one or more portions from each other. As a further example, collapsing the fully folded pannier can involve unfolding and/or separating the portions of the pannier until a substantially flat, unfolded blank is achieved.

The term "align" or "substantially align" as used herein is defined as placement adjacent to or substantially parallel to another element. In some embodiments, aligning or substantially aligning includes placement of two elements from about 0 inches to about 0.25 inches relative to each other.

The exemplary blanks discussed herein include a plurality of fold lines such that the blanks can be folded into a folded configuration for mounting to a bicycle rack and transporting or storing items, and subsequently unfolded into an unfolded (e.g., collapsed) configuration for storage. The exemplary blanks can initially define a substantially flat configuration convenient for shipping the blank as a pannier system kit prior to folding into the folded configuration. The fold lines allow for the sections, flaps and/or tabs of the blank to be hingedly connected relative to each other for folding of the blank into the folded pannier configuration. It should be understood that the flaps/tabs of the exemplary blanks are integrally formed out of a single or unitary piece of material, such that the single blank can be folded into the exemplary pannier. It should further be understood that the exemplary fold lines discussed herein can be added in a variety of configurations to permit the blanks to be folded into the pannier configuration. In some embodiments, the fold lines can be formed as continuous, partial depth cuts in the blank to provide for convenient, guided folding at the appropriate areas. In some embodiments, the fold lines can be formed as a perforated line. In some embodiments, the fold lines can be formed on a plastic blank with the use of a strip heater. In some embodiments, the folds can be formed on a sheet metal blank with the use of a metal break.

In some embodiments, the blanks can include one or more openings formed therein, and rivets (or any other fastener) can be used to detachably secure one or more flaps/sections of the blank to each other. In some embodiments, one or more flaps/sections of the blank can be secured to each other using, e.g., VELCRO™, glue, screws, tape, ultrasonic weld, blind rivets, sex bolts, or the like. Although not shown, in some embodiments, a strap can be secured to the blank in the folded configuration for transport of the folded pannier. In some embodiments, the folded pannier can include VEL-CRO™ or any other attachment structure for maintaining the lid in a closed position.

FIG. 1 is a top view of an exemplary pannier blank 100 in an unfolded, substantially flat configuration. The flat and planar configuration of the blank 100 in the unfolded configuration can define a substantially uniform thickness. For reference, a top edge 102 of the blank 100 defines a proximal end 104 and a bottom edge 106 defines a distal end 108 of the blank 100. A central, vertical axis 110 extends between the proximal and distal ends 104, 108. For reference, the lateral side of blank 100 on the right side of the axis 110 as viewed from the top can be referred to as the right side 112 of the blank, and the lateral side of the blank 100 on the left side of the axis 110 as viewed from the top can be referred to as the left side 114. The flaps/sections and fold lines on the right and left sides 112, 114 of the axis 110 can be substantially symmetrical. As referred to herein, a length of a component can refer to a distance substantially parallel to the axis 110, and a width of a component can refer to a distance substantially perpendicular to the axis 110.

The blank 100 includes a lid section 116 at the proximal end 104. The lid section 116 can define a substantially rectangular configuration, with one edge being defined by the top edge 102 of the blank 100. In some embodiments, the inner surface of the lid section 116 (the surface facing upwardly in FIG. 1) can include an attachment mechanism 118 (e.g., VELCRO™, or the like) near the top edge 102. The outer, opposing surface of a second blank 100 can include a complementary attachment mechanism 118 such that the lid sections 116 of the two blanks 100 can be releasably engaged when in the folded configuration.

The blank 100 includes a first overhang section 120 (e.g., right side overhang) hingedly connected to the right side of the lid section 116 at a fold line 122. The blank 100 includes a second overhang section 124 (e.g., a left side overhang) hingedly connected to the opposing, left side of the lid section 116 at a fold line 126. The overhang sections 120, 124 can define substantially rectangular configurations, with the fold lines 122, 126 extending substantially parallel to the axis 110. The overhang sections 120, 124 can have a width dimensioned substantially smaller than the width of the lid section 116, and a length substantially equal to the length of the lid section 116. Although exemplary dimensions or dimensional relationships are discussed herein, it should be understood that the dimensions of the flaps can be adjusted based on the configuration of the bicycle on which the pannier is to be mounted. In some embodiments, rather than or in addition to the overhang sections 120, 124, plastic or metal angle brackets can be coupled to the lid section 116.

The blank 100 includes a clearance section 128 hingedly connected to the lid section 116 at a fold line 130. The clearance section 128 can define a substantially rectangular configuration having a width dimensioned smaller that the width of the lid section 116, and a length substantially smaller than the length of the lid section 116. Particularly, the clearance section 128 can provide a minimal lip for folding the lid section 116 over the remaining portion of the folded blank 100, reducing interference between the lid section 116 and the remaining components during folding operation. The fold line 130 can extend substantially perpendicularly to the axis 110.

The blank 100 includes a lateral face section 132 hingedly connected to the clearance section 128 by a fold line 134. In some embodiments, the lateral face section 132 can be hingedly connected directly to the lid section 116 and the blank 100 can be formed without the clearance section 128. The lateral face section 132 can define a substantially trapezoidal configuration with the proximal edge (at the fold line 134) having a width dimensioned greater than the opposing distal edge, and side edges tapering between the proximal and distal edges. The fold line 134 can extend substantially perpendicularly to the axis 110.

The blank 100 includes first and second side arm face sections 136, 138 (e.g., right and left side arm face sections) hingedly connected to opposing lateral sides of the lateral face section 132 at fold lines 140, 142. Each arm face section 136, 138 can define a substantially L shaped configuration including a rectangular or trapezoidal vertical section 144, 146 and a rectangular lateral section 148, 150 with a rounded lateral edge 152, 154. The vertical sections 144, 146 can be hingedly connected to the lateral face section 132 at fold lines 140, 142 and extend at an angle relative to the axis 110 due to the trapezoidal shape of the lateral face section 132.

The lateral sections 148, 150 are integrally formed with the vertical sections 144, 146, extend substantially perpendicularly to the vertical sections 144, 146, and extend at an angle relative to the axis 110 due to the trapezoidal shape of the lateral face section 132. The width of the vertical sections 144, 146 can be dimensioned smaller than the length of the vertical sections 144, 146. The width of the lateral sections 148, 150 can be dimensioned greater than the length of the lateral sections 148, 150. In some embodiments, the arm face sections 136, 138 can include holes or openings 184, 186 formed therein near the distal edges of the vertical sections 144, 146. As will be discussed in greater detail below, rivets or sex bolts can be passed through the openings 184, 186 to secure the arm face sections 136, 138 to other sections/flaps of the blank 100 during the folding operation.

The blank 100 includes first and second lateral flaps 156, 158 (e.g., right and left side lateral flaps) hingedly connected to the edges of the vertical sections 144, 146 of the arm face sections 136, 138 at fold lines 160, 162. The fold lines 160, 162 can extend at an angle relative to the axis 110 and substantially parallel to the fold lines 140, 142. Each lateral flap 156, 158 can define a substantially triangular configuration with a rounded lateral edge 164, 166. The lateral flaps 156, 158 can be disposed between the vertical sections 144, 146 and lateral sections 148, 150 of the arm face sections 136, 138. In some embodiments, each lateral flap 156, 158 can include a hole or opening 168, 170 formed therein. The opening 168, 170 can be spaced from the rounded lateral edge 164, 166 and substantially centrally positioned relative to the side edges of the lateral flaps 156, 158.

The blank 100 includes a bottom section 172 hingedly connected to the lateral face section 132 at a fold line 174. The bottom section 172 can define a substantially rectangular configuration having a width dimensioned substantially similar to the distal edge of the lateral face section 132. The fold line 174 can extend substantially perpendicularly to the axis 110.

The blank 100 includes first and second lateral tabs 176, 178 (e.g., right and left side lateral tabs) hingedly connected to the bottom section 172 at fold lines 180, 182. Each lateral tab 176, 178 can define a substantially trapezoidal configuration with a top edge 188, 190 angled relative to the axis 110 and the opposing bottom edge substantially perpendicular to the axis 110. The fold lines 180, 182 and the opposing lateral edges can be substantially parallel to the axis 110. In some embodiments, holes or openings 192, 194 can be formed in the lateral tabs 176, 180 for engagement with respective rivets. The openings 192, 194 can be spaced from and substantially centrally positioned relative to the edges of the lateral tabs 176, 178.

The blank 100 includes a medial face section 196 hingedly connected to the bottom section 172 at fold line 198. The medial face section 196 can define a substantially trapezoidal configuration with the width of the proximal edge dimensioned smaller than the width of the distal edge and tapered side edges. The fold line 198 can extend substantially perpendicularly to the axis 110. In some embodiments, holes or openings 200, 202 can be formed in the medial face section 196. The openings 200, 202 can be spaced from the side edges and centrally positioned along the length of the medial face section 196.

The blank 100 includes a rack face section 204 hingedly connected to the medial face section 196 at fold line 206. The distal edge of the rack face section 204 defines the bottom edge 106 of the blank 100. The rack face section 204 can define a substantially rectangular configuration with a width dimensioned greater than a length. The fold line 206 can extend substantially perpendicularly to the axis 110.

The blank 100 includes first and second rack tabs 208, 210 (e.g., right and left rack tabs) hingedly connected to opposing sides of the rack face section 204 at fold lines 212, 214. Each of the rack tabs 208, 210 can define a substantially rectangular configuration with a width dimensioned smaller than a length. The fold lines 212, 214 can extend substantially parallel to the axis 110. As will be discussed below, the sections/flaps/tabs of the blank 100 can be folded along respective fold lines to reconfigure the blank 100 from the unfolded configuration shown in FIG. 1 to a fully folded, functioning pannier of FIG. 12.

With reference to FIGS. 2-5, the pannier blank 100 is shown in a partially folded configuration. Although the discussion herein is regarding folding of a single blank 100, it should be understood that two blanks 100 can be similarly folded and subsequently engaged with each over (and/or with the bicycle rack) to form the pannier system. In some embodiments, a single folded blank 100 can be engaged with the bicycle rack and used without a second folded blank 100. For clarity, FIGS. 2-12 include reference numbers only for the sections, flaps and tabs, and FIG. 1 includes reference numbers for all fold lines.

Initially, as shown in FIGS. 2-5, the lateral tabs 176, 178 can be folded inwardly by approximately 90° towards the bottom section 172 at fold lines 180, 182 to a position substantially perpendicular to the bottom section 172. Next, the lateral face section 132 can be folded counterclockwise along fold line 174 to be substantially perpendicular to the bottom section 172. The arm face sections 136, 138 can be folded inwardly by approximately 90° to be positioned against the lateral tabs 176, 178. Particularly, the arm face sections 136, 138 can be folded inwardly to substantially align the openings 184, 186 with the openings 192, 194 of the lateral tabs 176, 178. Rivets or any other fasteners can be passed through the openings 184, 186, 192, 194 to secure the arm face sections 136, 138 to the lateral tabs 176, 178

The lid section 116 can then be folded clockwise along fold line 130 to be substantially perpendicular to the lateral face section 132. In some embodiments, the clearance section 128 can be folded clockwise along fold line 134 (instead of folding the lid section 116) to be substantially perpendicular to the lateral face section 132, while remaining substantially parallel to the lid section 116. The lateral flaps 156, 158 can be partially rotated outwardly away from the lateral face section 132 along fold lines 160, 162.

The subsequent folding steps are shown in FIGS. 6-9. The rack tabs 208 can be folded inwardly by approximately 90° towards the rack face section 204 at fold lines 212, 214. The medial face section 196 can be folded clockwise towards the lateral face section 132 along fold line 198 until the side edges of the medial face section 196 are substantially aligned with fold lines 160, 162 of the arm face sections 136, 138. Next, the lateral flaps 156, 158 can be folded inwardly at fold lines 160, 162 to be positioned against the outer surface of the medial face section 196.

Particularly, the openings 168, 170 of the lateral flaps 156, 158 can be substantially aligned with the openings 200, 202 of the medial face section 196. Rivets or any other fasteners can be passed through the openings 168, 170, 200, 202 to secure the lateral flaps 156, 158 to the medial face section 196. The rack face section 204 can then be folded counterclockwise by approximately 90° until the fold lines 212, 214 are substantially aligned with the bottom edge of the rectangular lateral sections 148, 150 of the arm face sections 136, 138. In such operation, the rack tabs 208, 210 can be positioned against the inner surface of the arm face sections 136, 138. In some embodiments, rivets or any other fastener can be used to secure the rack tabs 208, 210 to the arm face sections 136, 138.

Figure 10:
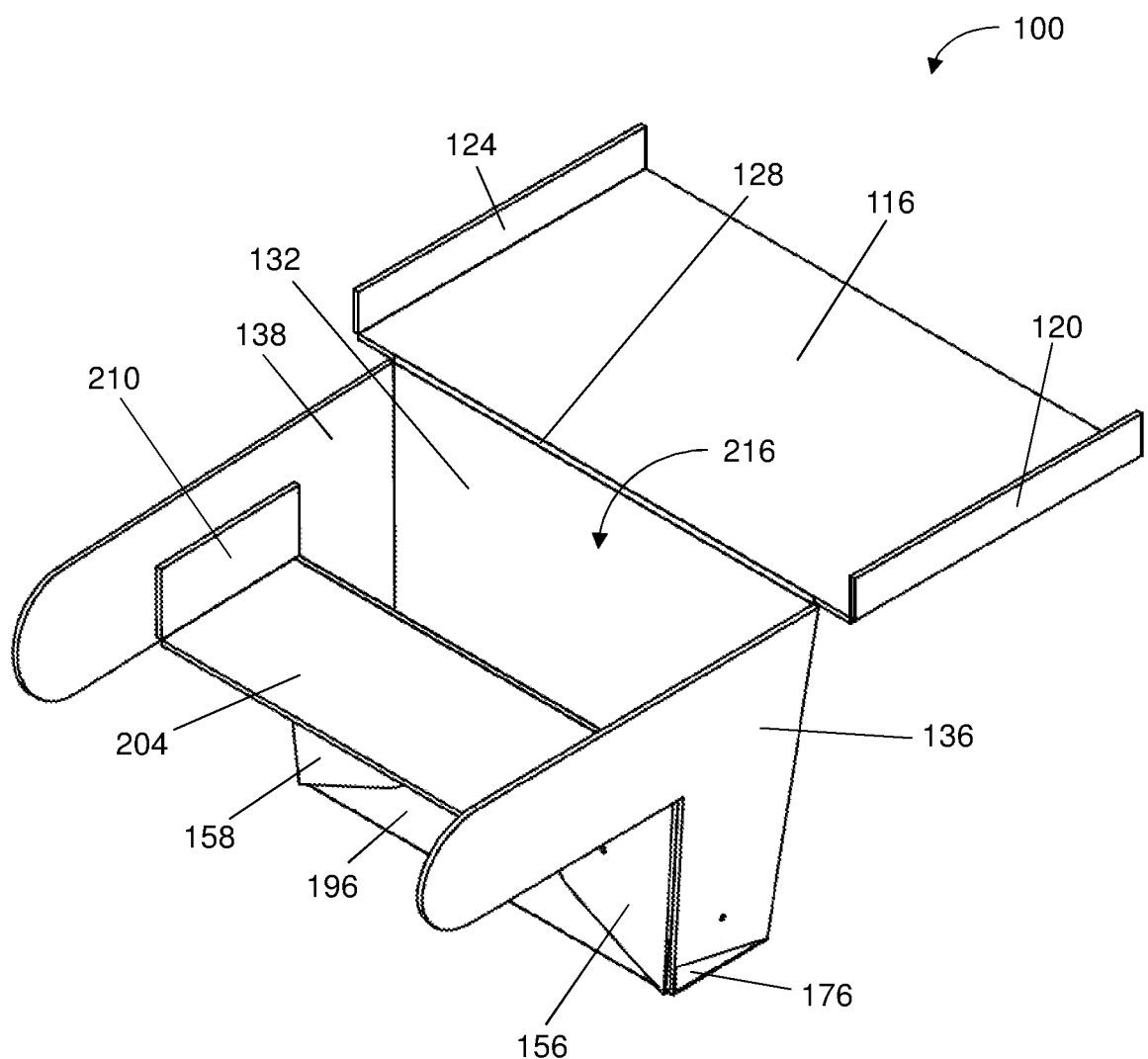
FIG. 10 is a perspective view of an exemplary pannier blank of the present disclosure in a partially folded configuration.
Figure 11:
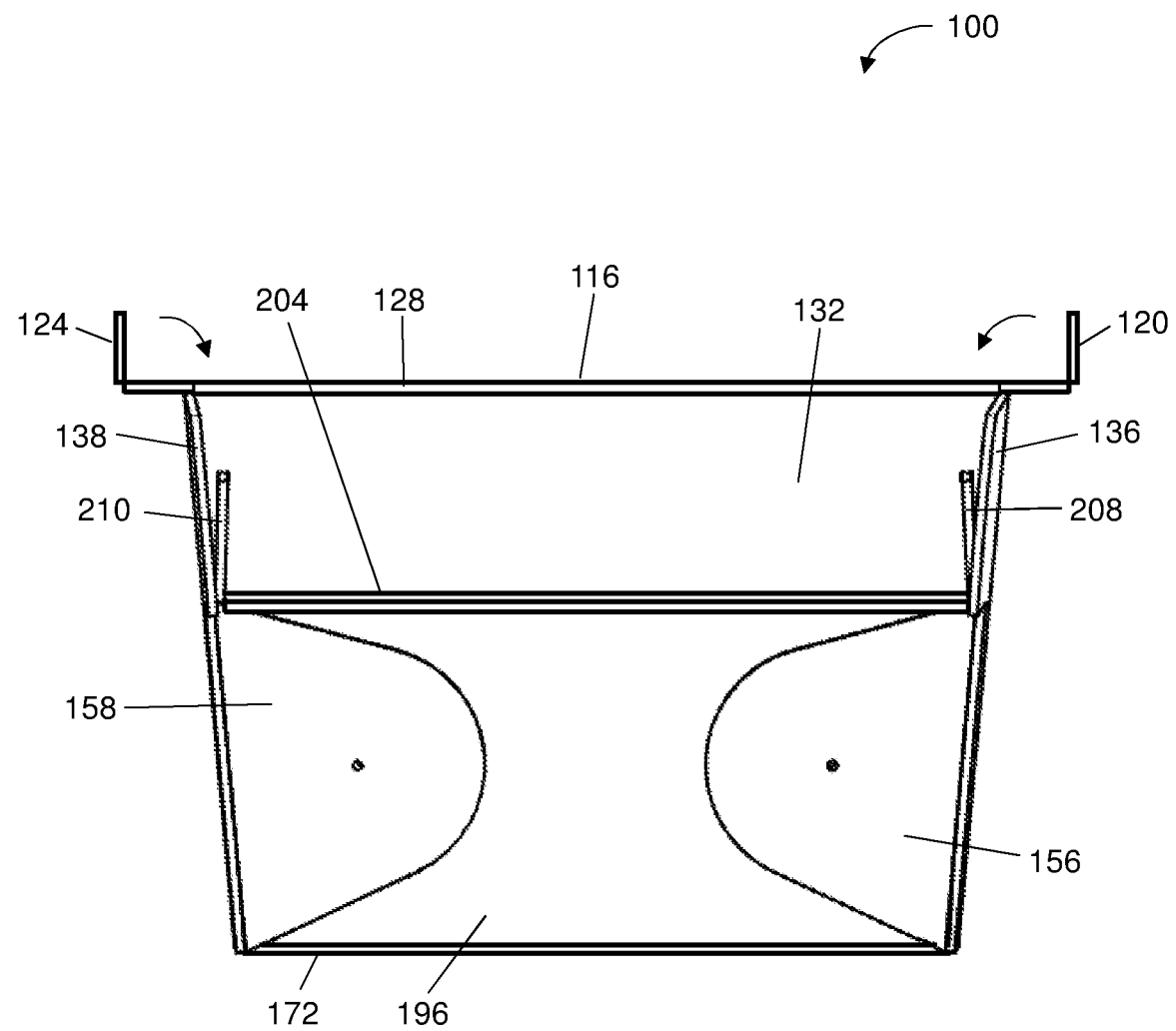
FIG. 11 is a side view of an exemplary pannier blank of FIG. 10.
Figure 12:
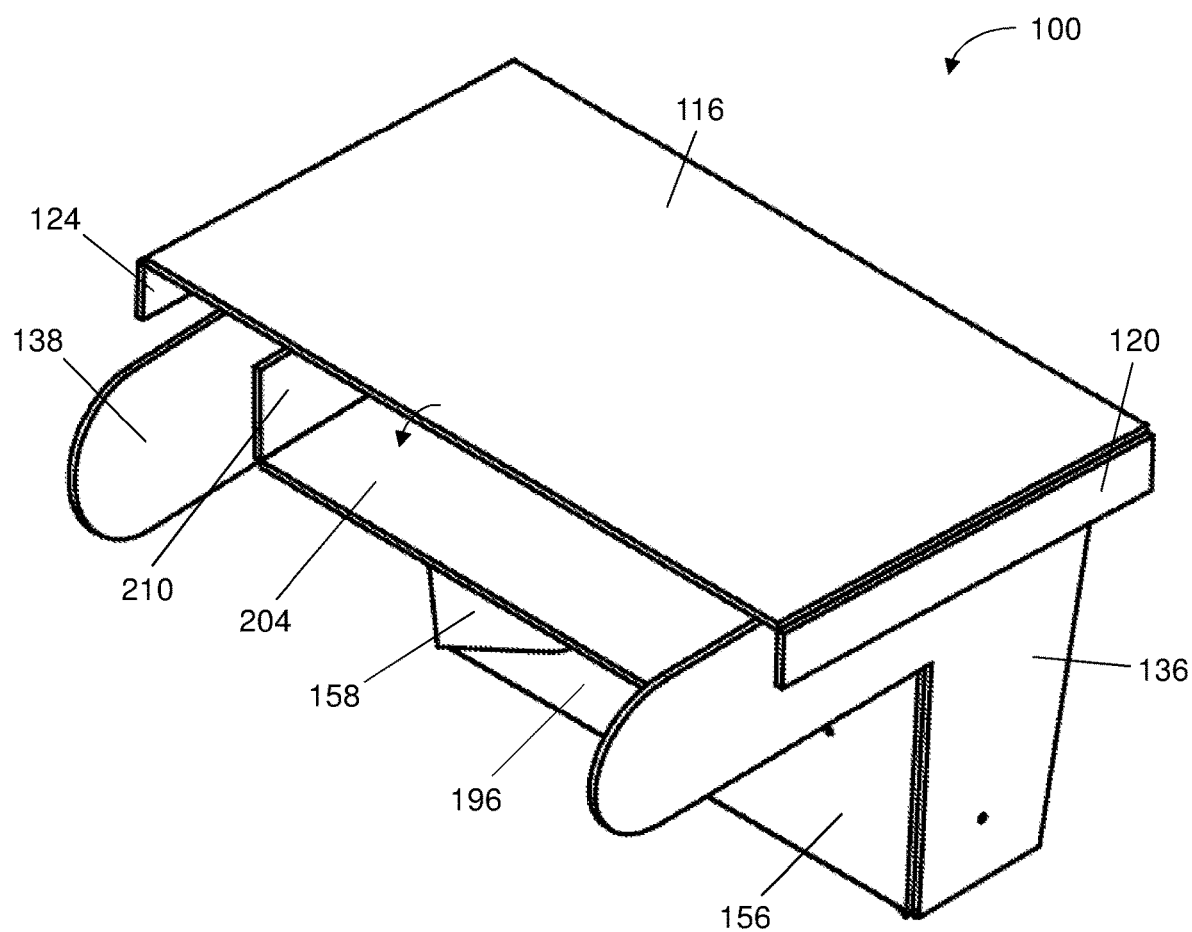
FIG. 12 is a perspective view of an exemplary pannier blank of the present disclosure in a fully folded configuration.
Figure 13:
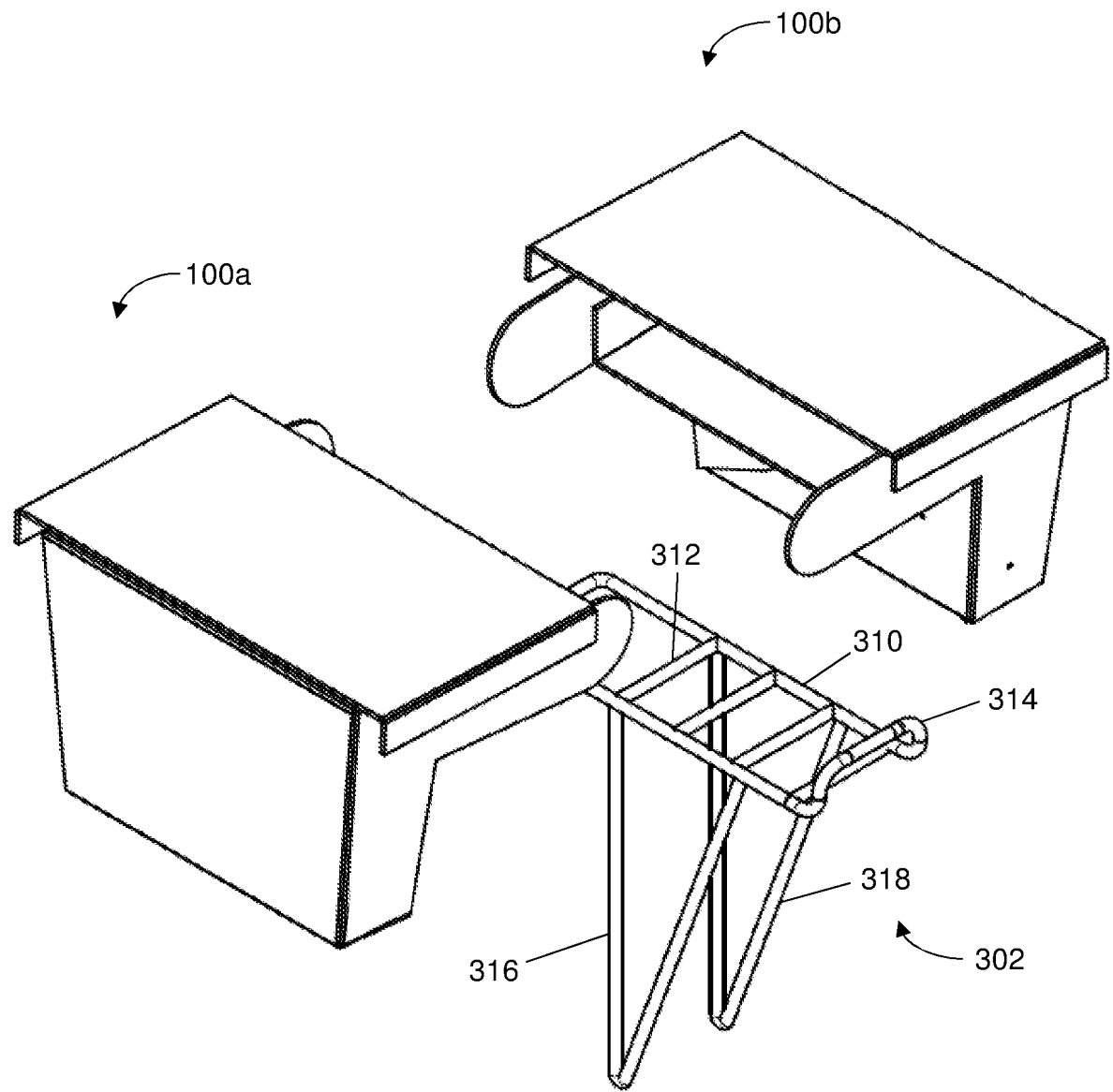
FIG. 13 is a perspective view of an exemplary pannier system of the present disclosure in preparation for mounting on a bicycle rack.
Figure 14:
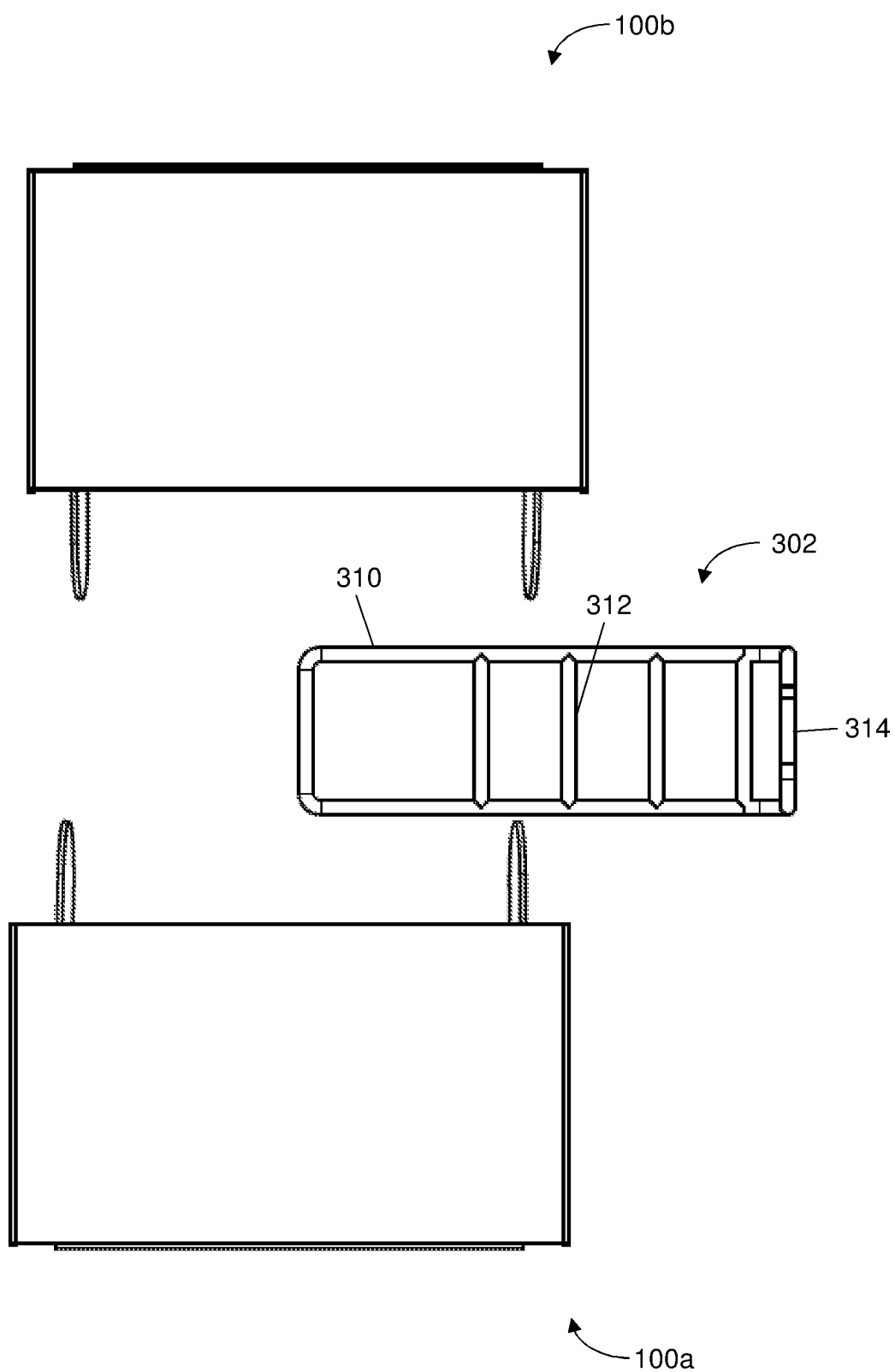
FIG. 14 is a top view of an exemplary pannier system of the present disclosure in preparation for mounting on a bicycle rack.
Figure 15:
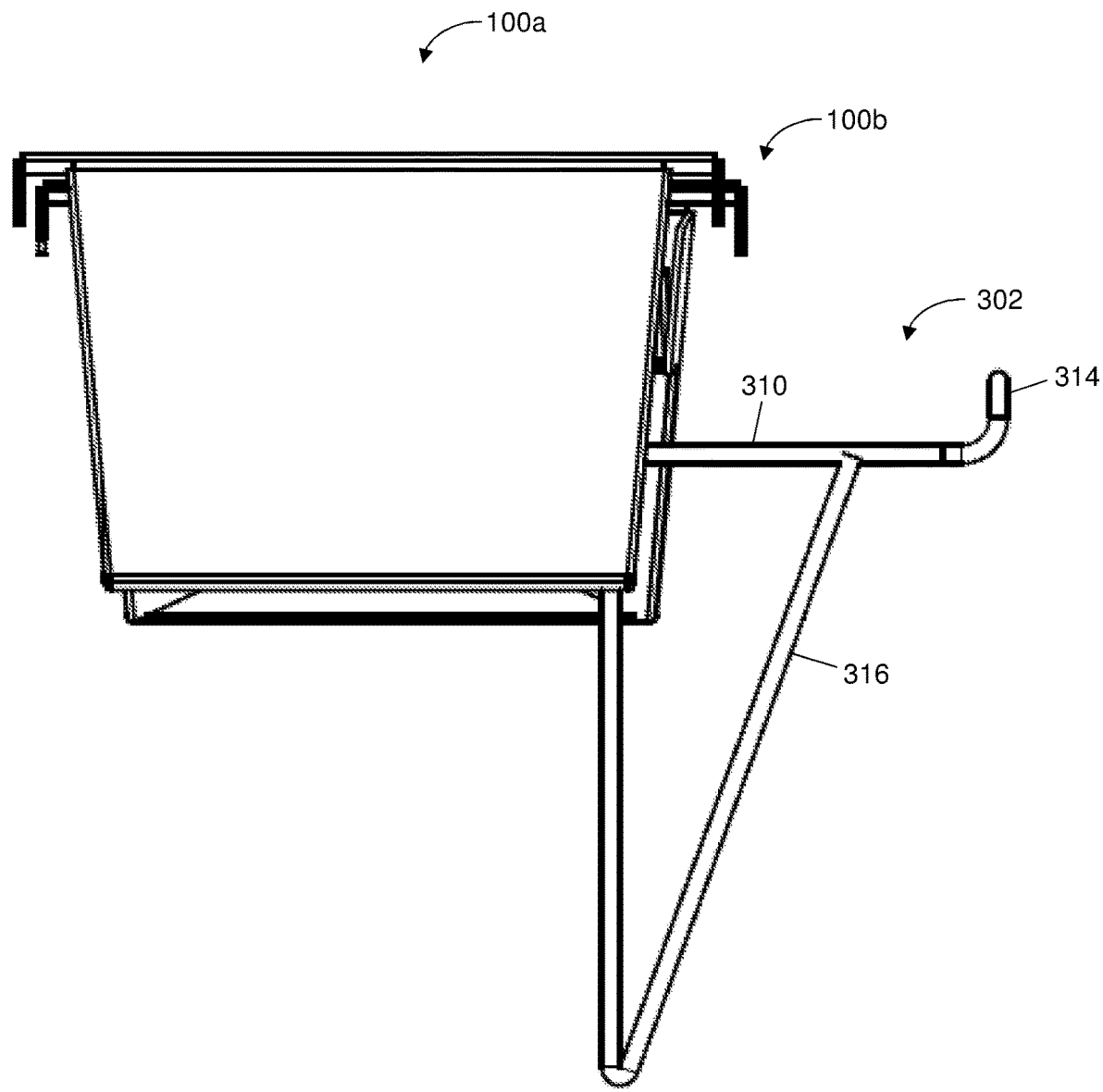
FIG. 15 is a side view of an exemplary pannier system of the present disclosure in preparation for mounting on a bicycle rack.
Figure 16:
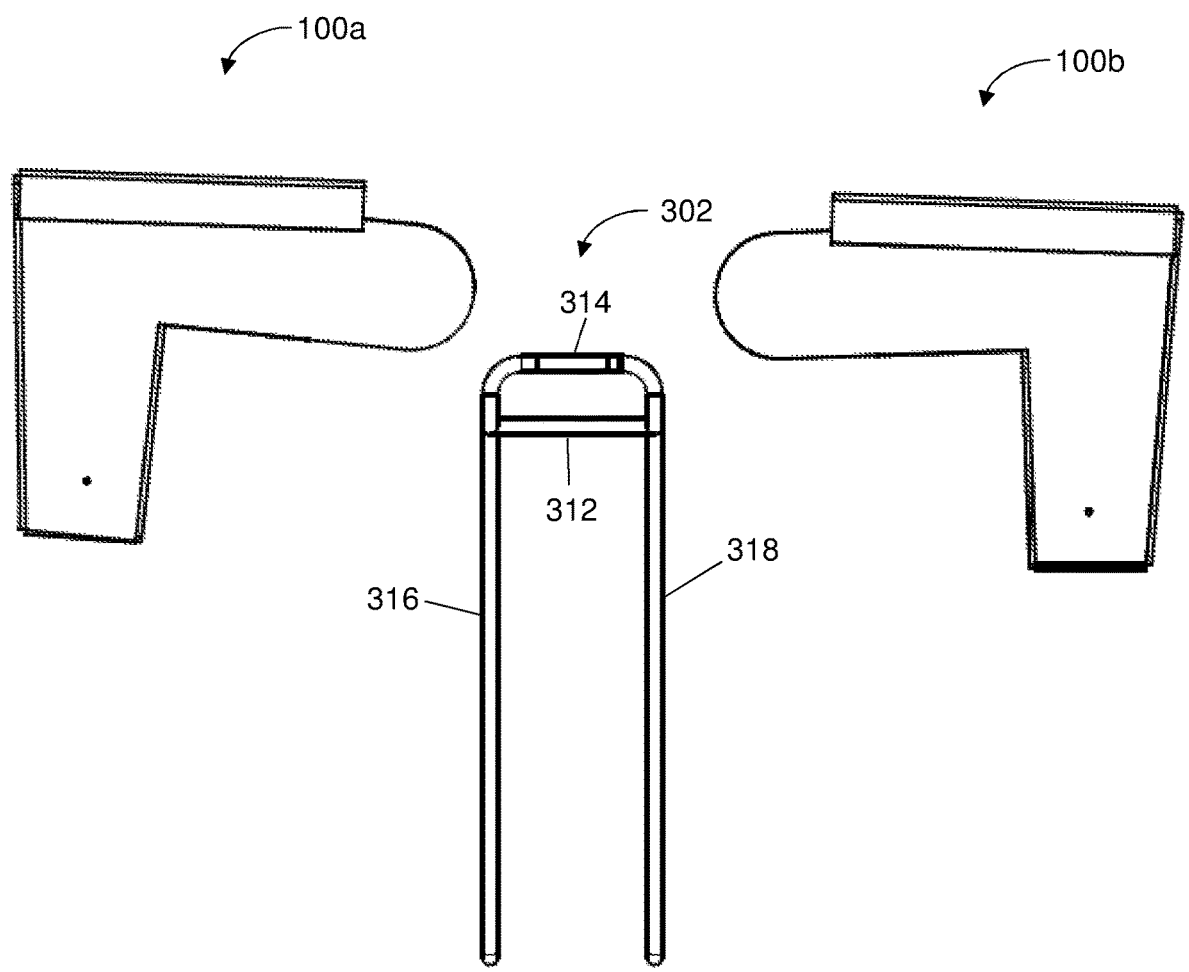
FIG. 16 is a front view of an exemplary pannier system of the present disclosure in preparation for mounting on a bicycle rack.
Figure 17:
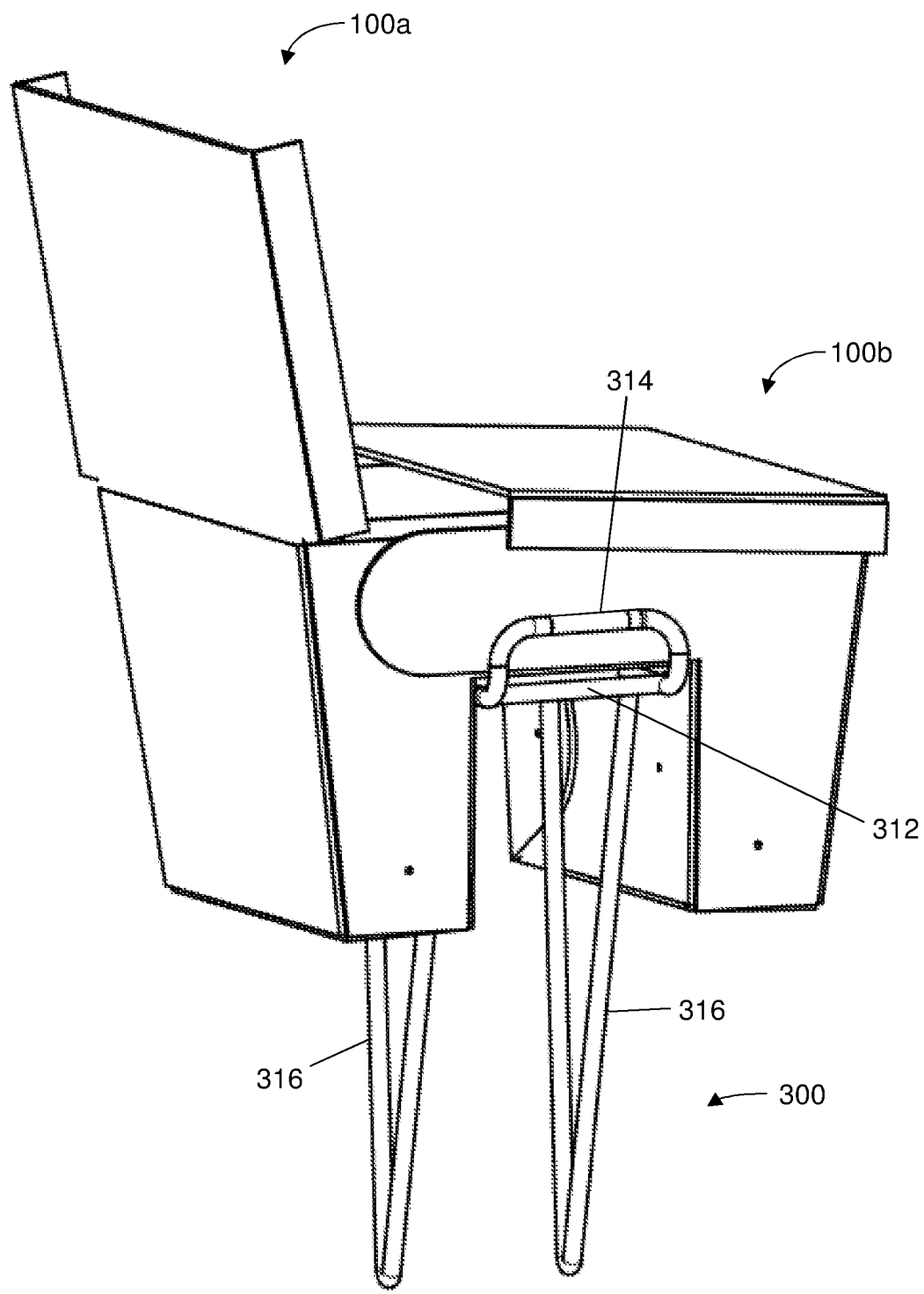
FIG. 17 is a perspective view of an exemplary pannier system of the present disclosure mounted on a bicycle rack with one lid section open.
Figure 18:
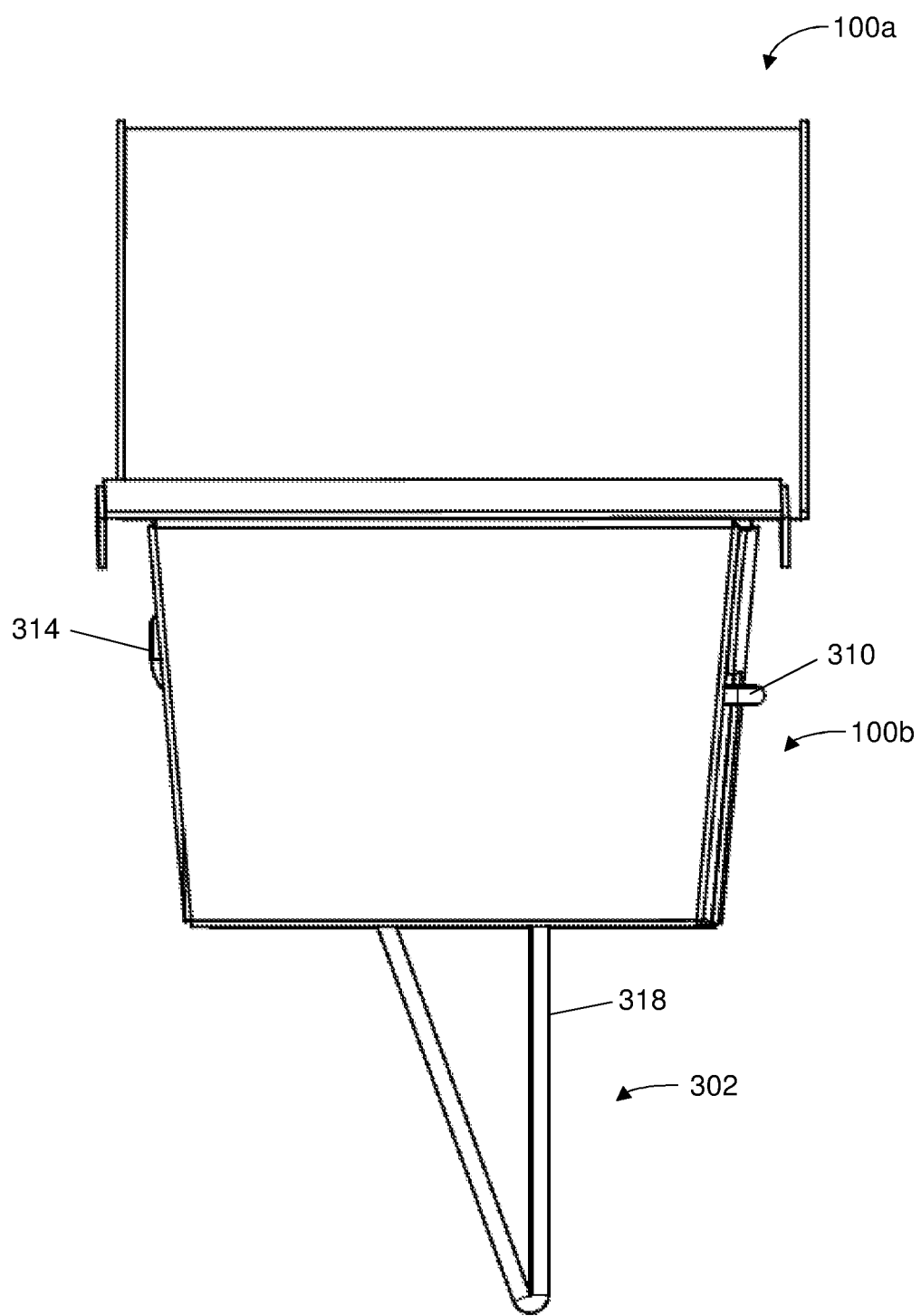
FIG. 18 is a side view of an exemplary pannier system of the present disclosure mounted on a bicycle rack with one lid section open.
Figure 19:
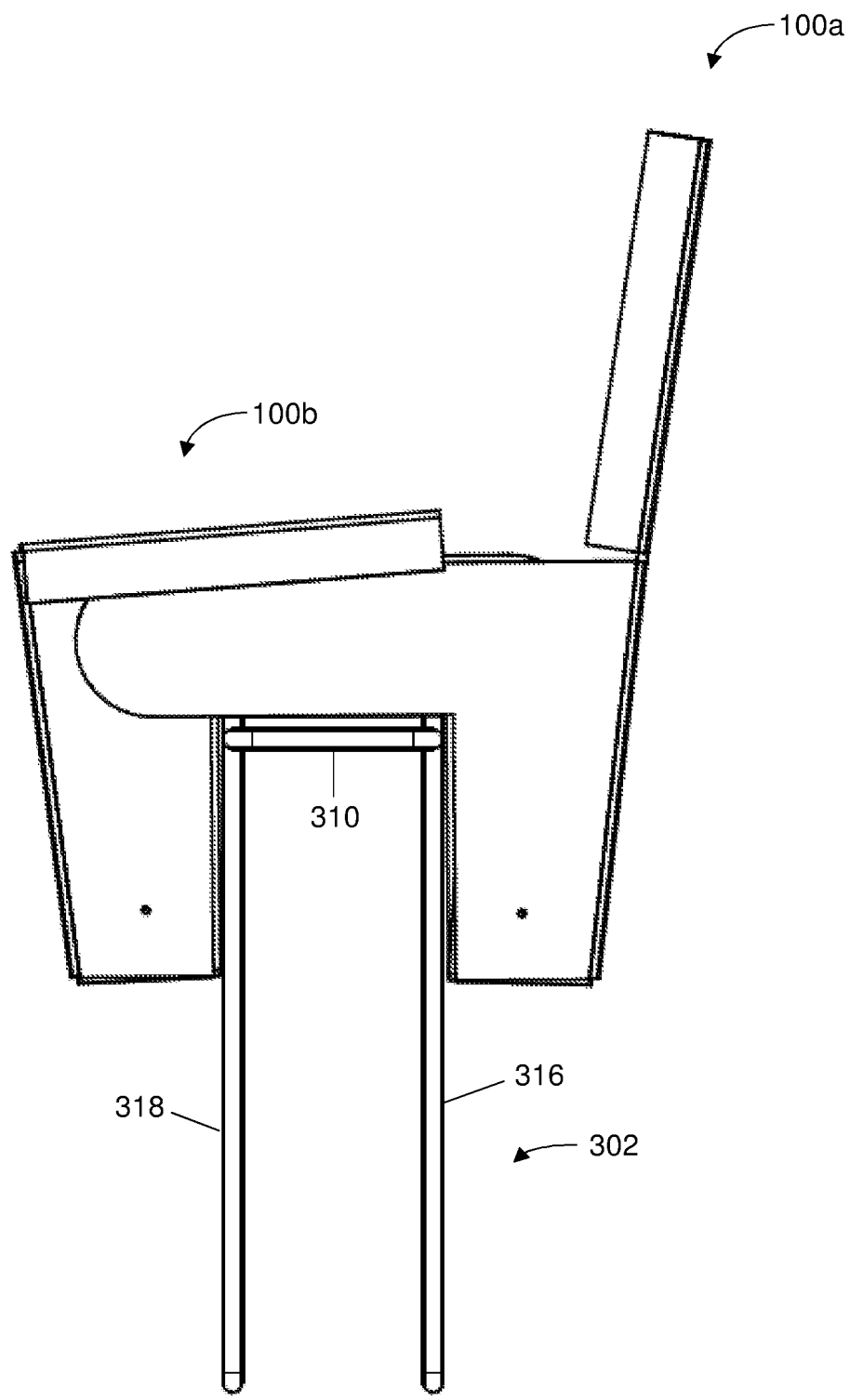
FIG. 19 is a rear view of an exemplary pannier system of the present disclosure mounted on a bicycle rack with one lid section open.
Figure 20:
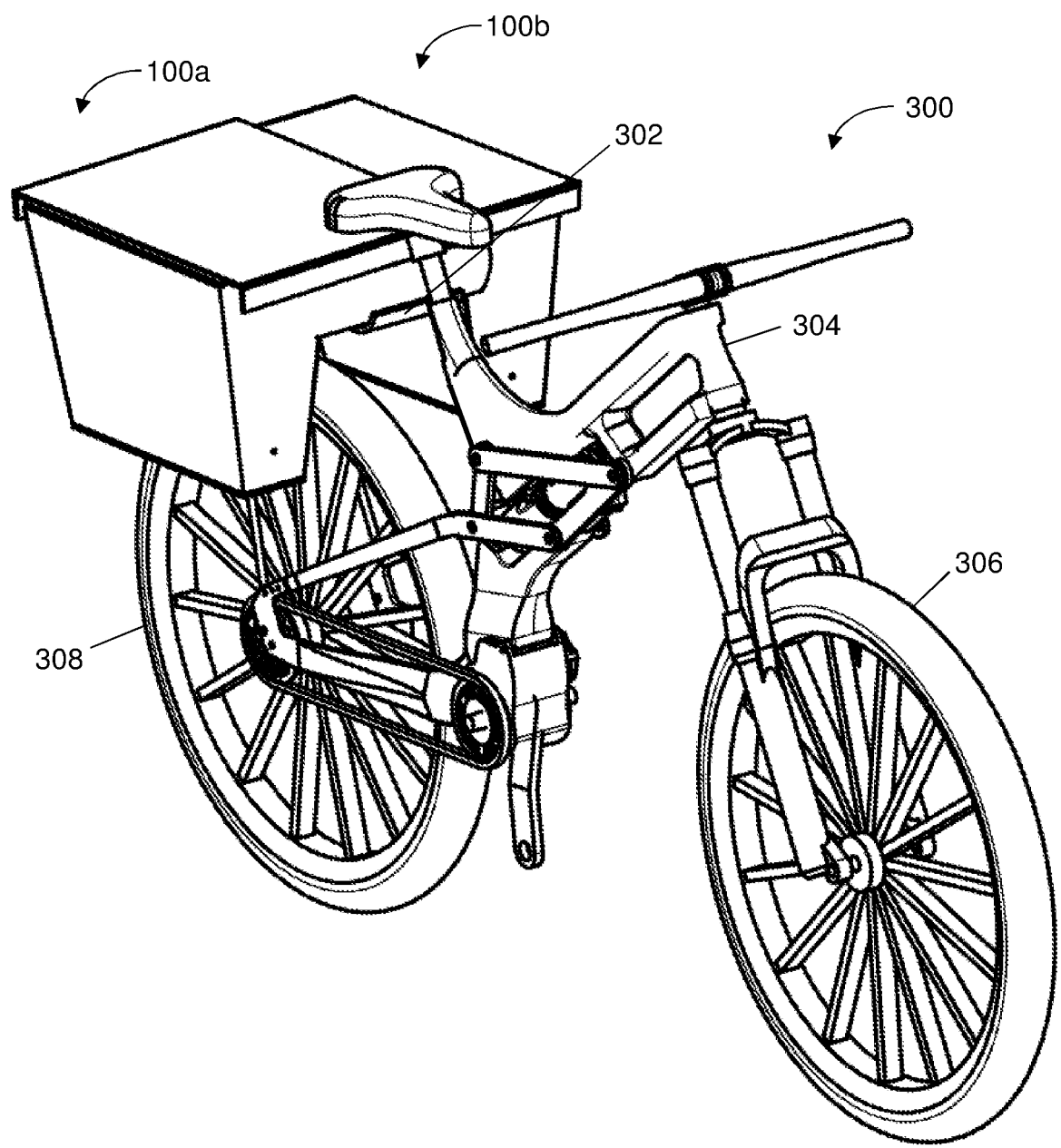
FIG. 20 is a perspective view of an exemplary pannier system of the present disclosure mounted on a bicycle rack with both lid sections in a closed configuration.

The subsequent folding steps are shown in FIGS. 10-12. Particularly, the overhang sections 120, 124 can be folded inwardly towards the lid section 116 by approximately 90° at fold lines 122, 126. As shown in FIG. 12, the lid section 116 can be folded counterclockwise by approximately 180° at fold line 130 to open and close the lid section 116. The blank 100 is shown in FIGS. 10-12 in a fully folded, pannier configuration capable of receiving one or more items in an enclosure 216 formed by the folded sections, flaps and tabs, and the lid section 116 can be folded over the enclosure 216 to protect the contents within the enclosure 216 (see, e.g., FIGS. 10 and 12).

FIGS. 13-16 show various views of two folded blanks (designated as blank 100a and 100b) in preparation for mounting the blanks 100a, 100b on a rack 302 of a bicycle 300. The blanks 100a and 100b collectively can form an exemplary pannier system. FIGS. 17-20 show the blanks 100a, 100b mounted to the rack 302. It should be understood that two blanks 100 can be folded in a substantially similar manner, and the first blank 100a can be rotated approximately 180 degrees to face the second blank 100b in preparation for engagement over the rack 302.

The bicycle 300 generally includes a frame 304, a front wheel 306, and rear wheel 308, and the rack 302 mounted to the frame 304. In some embodiments, the rack 302 can be mounted over the rear wheel 308. In some embodiments, the rack 302 can be mounted over the front wheel 306. Although a bicycle 300 is shown, it should be understood that the blanks 100a, 100b can be mounted to any type of vehicle having a rack 302 or supporting surface. Further, although two blanks 100a, 100b are shown, it should be understood that in some embodiments only a single blank 100a, 100b can be mounted to the rack 302 or supporting surface.

The rack 302 can include a supporting top surface 310, cross-bars 312 extending between the side members of the top surface 310, a front raised edge 314, and downwardly directed extensions 316, 318 (e.g., triangular shaped extensions) for mounting the rack 302 to the frame 304 of the bicycle 300. During mounting, the first folded blank 100a can be slightly laterally offset from the second folded blank 100b such that the arm face section 136 of the first blank 100a is positioned against the outer surface of the arm face section 138 of the second blank 100a, and the arm face section 138 of the first blank 100a is positioned against the inner surface of the arm face section 136 of the second blank 100b (see, e.g., FIG. 17).

In some embodiments, the lateral and/or medial position of the fold lines 122, 126 for the overhang sections 120, 124, and the lateral and/or medial position of the fold lines 212, 214 for the rack tabs 208, 210 can be shifted slightly (e.g., by 0.25 inches or less, by the material thickness, or the like) to allow for clearance between the lid sections 116 of the offset blanks 100a, 100b. The blanks 100a, 100b can be positioned over the rack 302 and slid towards each other until the medial face sections 196 are positioned against or immediately adjacent to the edges of the rack 302. Particularly, the medial face sections 196 remain spaced and form a passage in-between the blanks 100a, 100b configured to receive the rack 302.

In such position, the rack face sections 204 partially or fully overlap, and the interleaved rack face sections 204 are disposed over the top surface 310 of the rack 302. In some embodiments, the rack face sections 204 of the opposing blanks can be fastened to each other with the use of glue, rivets, VELCRO™, ultrasonic weld, sex bolts, or any other fastening element. In some embodiments, ultrasonic weld, rivets or any other fasteners can be used to secure the arm face sections 136, 138 of the opposing blanks 100a, 100b to each other. In some embodiments, rivets, ultrasonic weld, or any other fasteners can be used to secure the arm face sections 136, 138, and one or both of the rack tabs 210 of the opposing blanks 100a, 100b to each other. Straps, VELCRO™, or any other securing elements (not shown) can be used to secure the blanks 100a, 100b to the rack 302 to maintain the position of the blanks 100a, 100b during riding.

Figure 21:
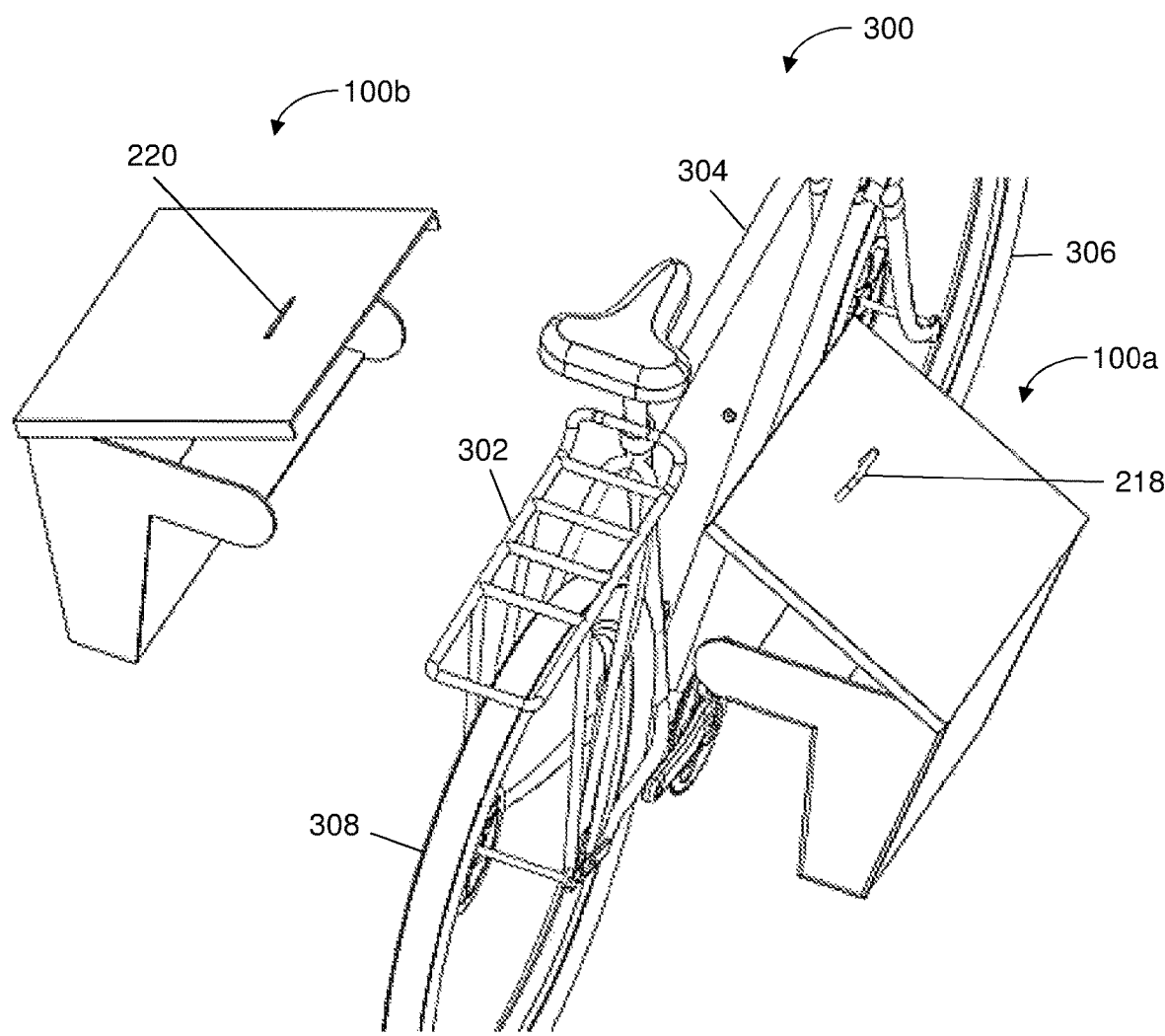
FIG. 21 is a perspective view of an exemplary pannier system of the present disclosure in preparation for mounting on a bicycle rack, the pannier system including pannier blanks with a handle assembly.

As noted above, any type of attachment mechanism 118 (e.g., VELCRO™, or the like) can be used to releasably secure the lid sections 116 of the blanks 100a, 100b to each other to maintain the lid sections 116 closed. In some embodiments, as shown in FIG. 21, a handle 218 can be mounted to the outer surface of the lid section 116 of the first blank 100a and a complementary cutout 220 can be formed in the opposing lid section 116 of the second blank 100b. In such embodiments, when the lid section 116 of the second blank 100b is closed over the lid section 116 of the first blank 100a, the cutout 220 can receive therethrough the protruding handle 218. Engagement between the handle 218 and the cutout 220 can maintain the closed position of the lid sections 116.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A blank for a collapsible, folded pannier, comprising:
a bottom section that forms an item supporting surface when the blank is folded into a folded pannier configuration;
a lateral face section hingedly connected with the bottom section at a first fold line;
a medial face section hingedly connected with the bottom section at a second fold line;
a lid section hingedly connected with the lateral face section at a third fold line; and
a rack face section hingedly connected with the medial face section at a fourth fold line;
wherein in the folded pannier configuration and with the lid section in a closed position, the lid section is disposed over and vertically spaced from the rack face section; and
wherein the blank is adapted to be folded from an unfolded blank configuration into a folded pannier configuration.

2. The blank of claim 1, wherein in the unfolded blank configuration, the blank defines a flat and planar structure.

3. The blank of claim 1, wherein in the folded pannier configuration, the blank is configured to be mounted on a rack of a bicycle.

4. The blank of claim 1, comprising a central, vertical axis extending between proximal and distal ends of the blank, the bottom section, lateral face section, medial face section, the lid section and the rack section extending in-line with the central, vertical axis.

5. The blank of claim 4, wherein the first, second, third and fourth fold lines extend perpendicularly to the central, vertical axis.

6. The blank of claim 1, wherein in the folded pannier configuration, the bottom section, the lateral face section, and the medial face section define an enclosure configured to receive therein one or more items, the vertical space between the rack face section and the lid section defining a lateral passage into the enclosure.

7. The blank of claim 1, comprising a clearance section hingedly connecting the lid section with the lateral face section.

8. The blank of claim 1, comprising first and second overhang sections hingedly connected to lateral sides of the lid section at fifth and sixth fold lines, the fifth and sixth fold lines extending parallel to a central, vertical axis of the blank.

9. The blank of claim 1, comprising first and second arm face sections hingedly connected to the lateral face section at seventh and eighth fold lines, the seventh and eighth fold lines extending at an angle relative to a central, vertical axis of the blank.

10. The blank of claim 9, wherein the first and second arm face sections each define an L-shaped configuration including a vertical section hingedly connected to the lateral face section and a lateral section extending from the vertical section away from the vertical section and the central, vertical axis.

11. The blank of claim 1, wherein the fourth fold line extends perpendicularly to a central, vertical axis of the blank.

12. The blank of claim 11, comprising first and second rack tabs hingedly connected to lateral sides of the rack face section at ninth and tenth fold lines, the ninth and tenth fold lines extending parallel to the central, vertical axis of the blank.

13. A collapsible, folded pannier system, comprising:
a first pannier; and
a second pannier engaged with the first pannier;
wherein each of the first and second panniers comprises:
   a bottom section that forms an item supporting surface of the first and second panniers in a folded pannier configuration;
   a lateral face section hingedly connected with the bottom section at a first fold line;
   a medial face section hingedly connected with the bottom section at a second fold line;
   a lid section hingedly connected with the lateral face section at a third fold line; and
   a rack face section hingedly connected with the medial face section at a fourth fold line, wherein in the folded pannier configuration and with the lid section in a closed position, the lid section is disposed over and vertically spaced from the rack face section;
wherein each of the first and second panniers is adapted to be folded from an unfolded configuration into the folded pannier configuration.

14. The pannier system of claim 13, wherein in the unfolded configuration, each of the first and second panniers defines a flat and planar structure.

15. The pannier system of claim 13, wherein the lateral face sections of the first and second panniers are spaced to form a passage configured to receive therein a bicycle rack, the first and second panniers configured to hang on opposing lateral sides of the bicycle rack.

16. The pannier system of claim 13, comprising complementary attachment mechanisms secured to the lid section of the first and second panniers, the attachment mechanisms configured to releasably engage the lid sections with each other.

17. The pannier system of claim 13, comprising a handle mounted to the lid section of the first pannier and a complementary cutout formed in the lid section of the second pannier, the handle configured to engage with the cutout to releasably engage the lid sections with each other.

18. The pannier system of claim 13, wherein in the folded pannier configuration, the bottom section, the lateral face section, and the medial face section of each of the first and second panniers define respective first and second enclosures configured to receive therein one or more items, the vertical space between the rack face section and the lid section of each of the first and second panniers defining a lateral passage into the respective first and second enclosures, and a lateral passage of the first pannier formed by the vertical space between the rack face section and the lid section facing a lateral passage of the second pannier formed by the vertical space between the rack face section and the lid section.

19. The pannier system of claim 13, comprising first and second arm face sections hingedly connected to the lateral face section at fifth and sixth fold lines, the fifth and sixth fold lines extending at an angle relative to a central, vertical axis of the blank.

20. A method of forming a blank for a collapsible, folded pannier, the method comprising:
   providing a blank defining a flat configuration;
   forming a bottom section in the blank, the bottom section forming an item supporting surface when the blank is folded into a folded pannier configuration;
   forming a lateral face section in the blank;
   forming a first fold line in the blank between the bottom section and the lateral face section;
   forming a medial face section in the blank;
   forming a second fold line in the blank between the bottom section and the medial face section;
   forming a lid section in the blank;
   forming a third fold line in the blank between the lateral face section and the lid section;
   forming a rack face section in the blank; and
   forming a fourth fold line in the blank between the medial face section and the race face section;
wherein the blank is adapted to be folded from an unfolded blank configuration into the folded pannier configuration; and
wherein in the folded pannier configuration and with the lid section in a closed position, the lid section is disposed over and vertically spaced from the rack face section.

* * * * *